(12) United States Patent
Chen

(10) Patent No.: US 7,519,845 B2
(45) Date of Patent: Apr. 14, 2009

(54) SOFTWARE-BASED AUDIO RENDERING

(75) Inventor: Bi Chen, San Jose, CA (US)

(73) Assignee: Microsoft Corporation, Redmond, WA (US)

(*) Notice: Subject to any disclaimer, the term of this patent is extended or adjusted under 35 U.S.C. 154(b) by 819 days.

(21) Appl. No.: 11/029,912

(22) Filed: Jan. 5, 2005

(65) Prior Publication Data
US 2006/0146185 A1 Jul. 6, 2006

(51) Int. Cl.
G06F 1/00 (2006.01)
(52) U.S. Cl. .................. 713/500; 713/400; 713/503
(58) Field of Classification Search .......... 713/400, 713/500, 503
See application file for complete search history.

(56) References Cited

U.S. PATENT DOCUMENTS

| | | | |
|---|---|---|---|
| 4,642,794 A | | 2/1987 | Lavelle et al. |
| 5,661,665 A | | 8/1997 | Glass et al. |
| 5,689,313 A | | 11/1997 | Sotheran |
| 5,761,434 A | * | 6/1998 | Hewitt ................... 709/231 |
| 5,764,965 A | * | 6/1998 | Poimboeuf et al. .......... 713/400 |
| 5,907,368 A | | 5/1999 | Nakamura et al. |
| 6,081,298 A | | 6/2000 | Artieri |
| 6,100,906 A | | 8/2000 | Asaro et al. |
| 6,144,323 A | | 11/2000 | Wise |
| 6,262,776 B1 | | 7/2001 | Griffits |
| 6,304,297 B1 | | 10/2001 | Swan |
| 6,429,902 B1 | | 8/2002 | Har-Chen et al. |
| 6,525,742 B2 | | 2/2003 | Nonomura et al. |
| 6,594,773 B1 | | 7/2003 | Lisitsa et al. |
| 6,598,172 B1 | * | 7/2003 | VanDeusen et al. ......... 713/503 |
| 6,606,410 B2 | | 8/2003 | Kim |
| 6,625,743 B1 | * | 9/2003 | Gulick ................... 713/400 |
| 6,768,433 B1 | * | 7/2004 | Toth et al. ................ 341/105 |
| 6,880,098 B1 | * | 4/2005 | Huntsman ................ 713/400 |
| 7,039,070 B2 | | 5/2006 | Kawakatsu |
| 7,224,736 B2 | | 5/2007 | Ota |
| 2002/0126083 A1 | | 9/2002 | Cairns et al. |
| 2002/0196366 A1 | * | 12/2002 | Cahill, III ................ 348/537 |

(Continued)

FOREIGN PATENT DOCUMENTS

WO    WO03054686    7/2003

(Continued)

OTHER PUBLICATIONS

Melvin et al., "An integrated ntp-rtcp solution to audio skew detection and compenasation for volp applications" Multimedia and Expo, 2003. Proceedings. 2003, International Conference on Jul. 6-9, 2003, Piscataway, NJ, USA, IEEE, pp. 537-540.

(Continued)

Primary Examiner—Thomas Lee
Assistant Examiner—Vincent T Tran
(74) Attorney, Agent, or Firm—Lee & Hayes, PLLC

(57) ABSTRACT

Software-based audio rendering is described. A particular implementation includes computer readable media configured to measure a first drift rate between an external clock and an audio clock until the drift reaches a threshold. Responsive to the drift reaching the threshold and based upon the first drift rate, the implementation manipulates the audio clock to achieve a second drift rate having a smaller value and an opposite polarity from the first drift rate.

12 Claims, 9 Drawing Sheets

U.S. PATENT DOCUMENTS

| | | | |
|---|---|---|---|
| 2003/0001849 | A1 | 1/2003 | Devins et al. |
| 2004/0239677 | A1 | 12/2004 | Mutanen et al. |
| 2005/0018775 | A1 | 1/2005 | Subramanian et al. |
| 2005/0234571 | A1* | 10/2005 | Holmes .................. 700/94 |
| 2006/0007200 | A1 | 1/2006 | Young et al. |
| 2006/0078300 | A1 | 4/2006 | Salomons et al. |
| 2006/0104367 | A1 | 5/2006 | Bruls et al. |
| 2006/0104599 | A1 | 5/2006 | Law et al. |
| 2006/0133515 | A1 | 6/2006 | Mpr et al. |
| 2006/0164424 | A1 | 7/2006 | Wiley et al. |

FOREIGN PATENT DOCUMENTS

| | | |
|---|---|---|
| WO | WO2004039056 | 5/2004 |

OTHER PUBLICATIONS

Akester, Richard, "A New Audio Skew Detection and Correction Algorithm", Multimedia and Expo, 2002. ICME '02. Proceedings of 2002 IEEE International Conference on Lausanne, Switzerland Aug. 26-29, 2002. Piscataway, NJ, USA, IEEE vol. 2, pp. 261-264.

Hodson et al., "Skew Detection and Compensation for Internet Audio Applications", Multimedia and Expo. ICME 2000. IEEE International Conference on New York, NY, USA, Jul. 30-Aug. 2, 2000, Piscataway, NJ, pp. 1687-1690.

Trump, T. "Compensation for Clock Skew in Voice Over Packet Networks by Speech Interpolation", Circuits and Systems, 2004. ISCAS Proceedings of the 2004 International Symposium on Vancouver, BC. May 23-26, 2004, Piscataway, NJ, USA, vol. 5, pp. 608-611.

* cited by examiner

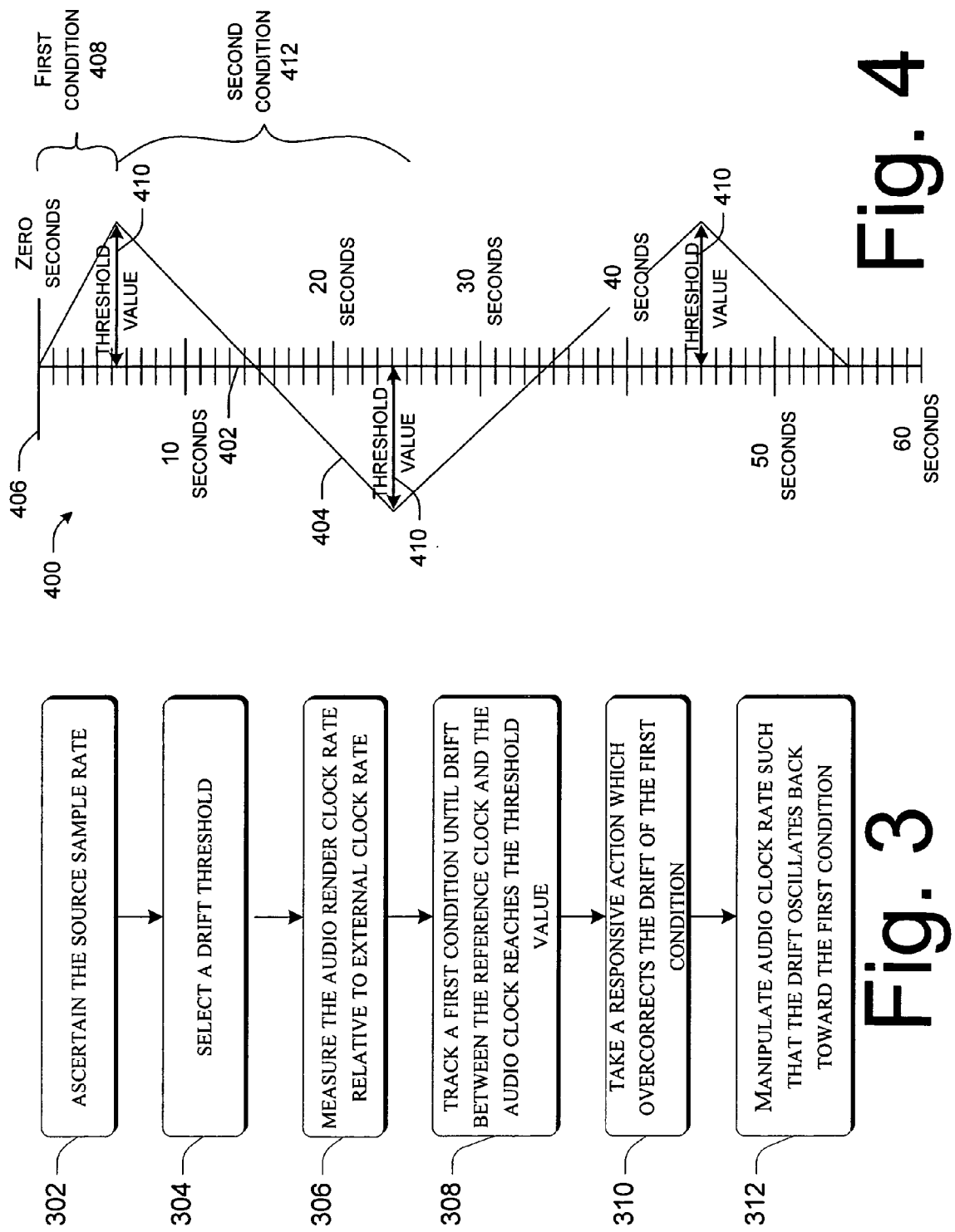

SOFTWARE-BASED AUDIO RENDERING

TECHNICAL FIELD

The invention pertains to media rendering and particularly to software-based audio rendering.

BACKGROUND

A large consumer demand exists for listening to, and/or viewing media content. Such media content is readily available from a multitude of sources. Consumers desire a quality experience when they watch and/or listen to such media. Further, consumers appreciate a single versatile consumer device that can perform multiple functions and still provide a quality user experience.

A personal computer (PC) provides a versatile platform for viewing and/or listening to media. The PC obtains the media, parses it into audio data and video data as appropriate. The PC then decodes the media, and renders the data for presentation to a user such as through a display device and/or speakers. The PC utilizes software-based components alone or in combination with hardware components to decode and render the media. The PC platform's software-based configuration is versatile since it is adaptable to playing various media formats. Further, as new formats are developed, the PC can be updated to handle the new formats. Often such updating can be done automatically with little or no user effort. Other platforms, such as hardware-based platforms, are less versatile as they are 'configured' upon manufacture and may have no or limited such capabilities.

This versatility of the PC has led to great consumer acceptance. However, in order to leverage its versatility, the PC platform has given priority to various design parameters over others. For example, in instances where audio samples are acquired from a live source, audio rendering on existing PC platforms may not have the ability to coordinate an audio hardware render rate with an audio sample capture rate. Any difference between the two, however minute, becomes significant over extended play times, if unchecked.

For example, in an instance where audio samples are captured from a live source such as from terrestrial, cable, or satellite Radio or TV broadcasting systems, the drift between source clock and audio render hardware clock may eventually become so great that some audio samples have to be thrown away or silence has to been inserted into the live audio stream. Such a scenario can produce a less pleasing user experience. Further, on PC platforms where the audio rendering component renders based upon its own clock which often may not be synchronized with the media source or the video rendering components, a scenario may occur where the audio presentation is out of synchronization with the corresponding video presentation to such an extent as to be easily noticed by a viewer. Such scenarios are exacerbated by long play times such as playing a movie or when viewing a single TV channel for long durations.

As technology progresses, consumers desire the flexibility offered by the current PC's software based platform combined with increased image and/or sound quality to fill an ever expanding niche of consumer devices and scenarios.

SUMMARY

Software-based audio rendering is described. A particular implementation includes computer readable media configured to measure a first drift rate between an external clock and an audio clock until the drift reaches a threshold. Responsive to the drift reaching the threshold and based upon the first drift rate, the implementation manipulates the audio clock to achieve a second drift rate having a smaller value and an opposite polarity from the first drift rate.

Another implementation determines a potential audio rendering time for a first audio sample. The implementation ascertains a potential video rendering time for a first video frame. The implementation renders the first audio sample and the first video frame at the later of the potential audio rendering time and the potential video rendering time.

BRIEF DESCRIPTION OF THE DRAWINGS

FIG. 3 comprises a flow diagram that illustrates an exemplary software-based audio rendering process.

FIG. 4 illustrates a representation of a timeline and events associated with exemplary software-based audio rendering implementations.

DETAILED DESCRIPTION

Overview

Figure 1:
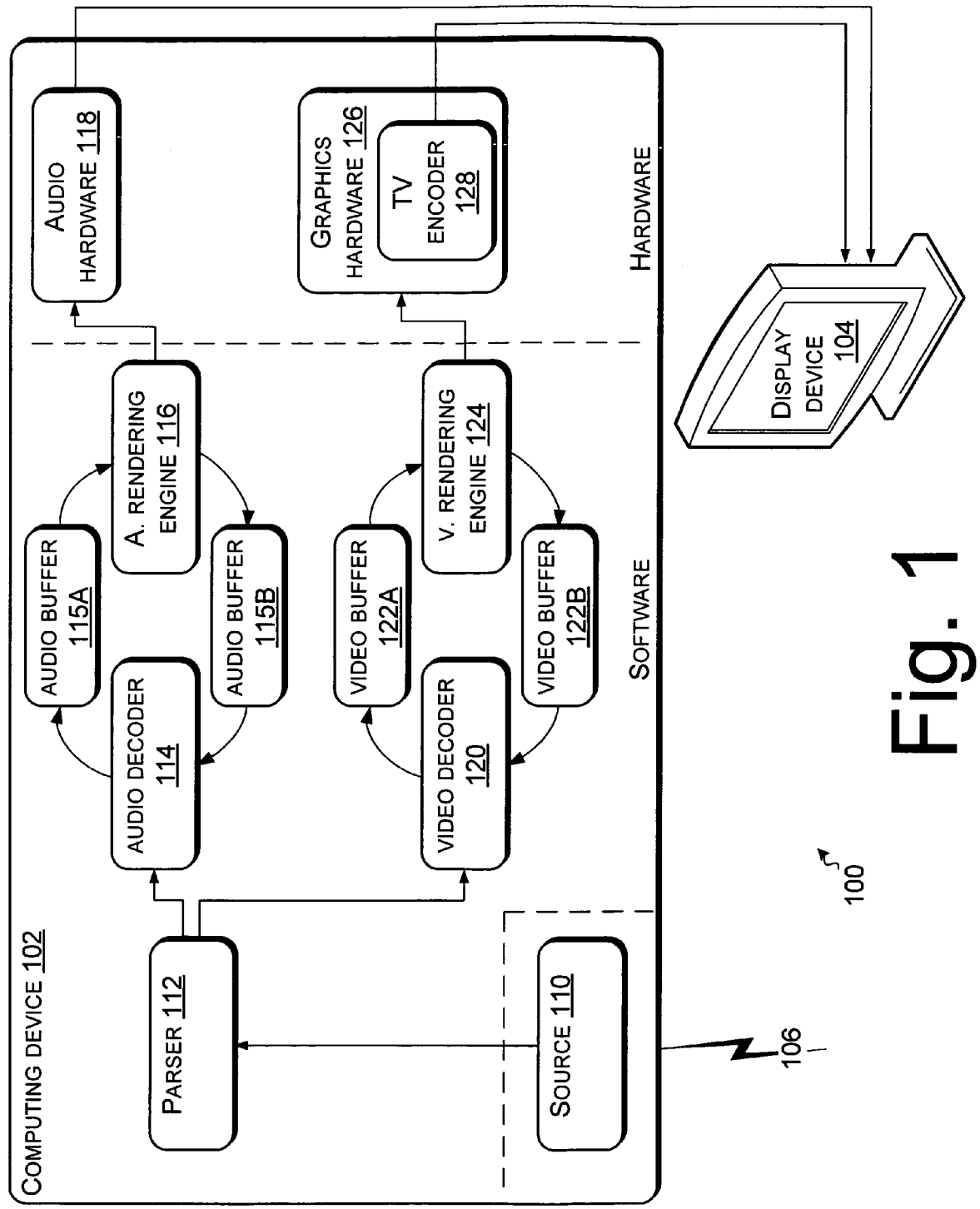
FIG. 1 illustrates a representation of an exemplary system in which software-based audio rendering can be implemented.

The following description relates to methods and systems for software-based audio rendering and/or synchronizing an audio rendering process with an external clock and/or a video rendering process.

Digital audio content can be thought of as multiple samples configured to be processed at a given source rate to produce sound for a user. A source provides audio samples at the given audio sampling rate in accordance with a source clock. An audio decoder decodes the audio samples and makes individual samples of the decoded content available for rendering. The audio samples can be rendered to audio hardware. The audio hardware has a processing cycle set according to the given source rate. The audio hardware processes or consumes samples at the source sampling rate in accordance with the audio hardware's clock, which may be slightly different from the source hardware's clock.

A software-based audio rendering process can coordinate production of audio content from the source and consumption or processing of the content at the audio hardware. The software-based audio rendering process utilizes an audio clock time to coordinate the rendering process. The audio clock is derived from a number of audio samples consumed by the audio hardware in a unit of time, which reflects the audio hardware's clock.

In one implementation, a software-based audio rendering process synchronizes its audio clock with the external clock by measuring a rate of the audio clock relative to the external clock. For instance the audio rendering process may measure the rate during a first condition where the drift is approaching a threshold value. The threshold value can be selected from a range of values that are greater than any system jitter, but less than a value that would produce noticeable lip sync disparity. The audio rendering process can then, based upon the measured rate, overcompensate to a second condition so that the clock drift cancels out. Some implementations take further steps to fine-tune the rate of drift between the measured rate and the audio rate such that the audio clock rate oscillates around the measured rate. These implementations may contemplate issues such as system jitter and lip sync disparity when selecting how the audio rate oscillates around the measured rate. As the audio clock oscillates around the measured rate cumulative drift cancels out to provide a very pleasing user experience.

Some implementations, manipulate the audio clock utilizing rate re-sampling which involves dropping or decimating individual frames or rendering individual frames multiple times depending on the circumstances. Rate re-sampling as a means of manipulating the audio clock rate will be described in more detail below.

To create video images for a user, a display device and associated graphics hardware are configured to generate a series of sequential images which the user perceives as 'motion video'. The display device is configured according to a set of standards to conform to a very precise display or operating cycle. For a consistent period of each display cycle the display device generates an image from an available video frame. A software-based video rendering process is configured to track this display cycle. The software-based video rendering engine can render individual video frames for the display device at a suitable point in the display cycle based upon this tracking. A user's perception or viewing experience of the motion video is enhanced when a series of individual frames are rendered in accordance with the display device's display cycle.

Further, the user's viewing experience is enhanced when corresponding audio and video data are presented in a synchronized manner for the user. Implementations are described for synchronizing audio and video presentation. For instance, when a user issues a play command such as for a movie, the synchronization process can determine a potential audio rendering time for a first audio sample of the movie and can ascertain a potential video rendering time for a first video frame of the movie. The synchronization process can then render the first audio sample and the first video frame at the later of the potential audio rendering time and the potential video rendering time such that the audio and video presentations begin at the same time.

The implementations described below are described in the context of a computing environment. Various configurations can be implemented by computer-executable instructions or code means, such as program modules, that are executed by a computer, such as a personal computer or PC. Generally, program modules include routines, programs, objects, components, data structures and the like that perform particular tasks or implement particular abstract data types.

Various embodiments may be implemented in computer system configurations other than a PC. For example, various embodiments may be realized in hand-held devices, multi-processor systems, microprocessor-based or programmable consumer electronics, network PCs, minicomputers, mainframe computers and the like. Further, as technology continues to evolve various embodiments may be realized on yet to be identified classes of devices. For example, the versatility of the present implementations combined with ever increasing processing power may produce devices resembling today's cell phones in general physical appearance, but which can perform various combined functionalities via the device's processing capabilities, data transmission capabilities and/or display capabilities. This is but one of many existing and developing configurations for the described implementations.

Alternately or additionally, various embodiments may also be practiced in distributed computing environments, where tasks are performed by remote processing devices that are linked through a communications network. In a distributed computing environment, program modules may be located in both local and remote memory storage devices.

Figure 2:
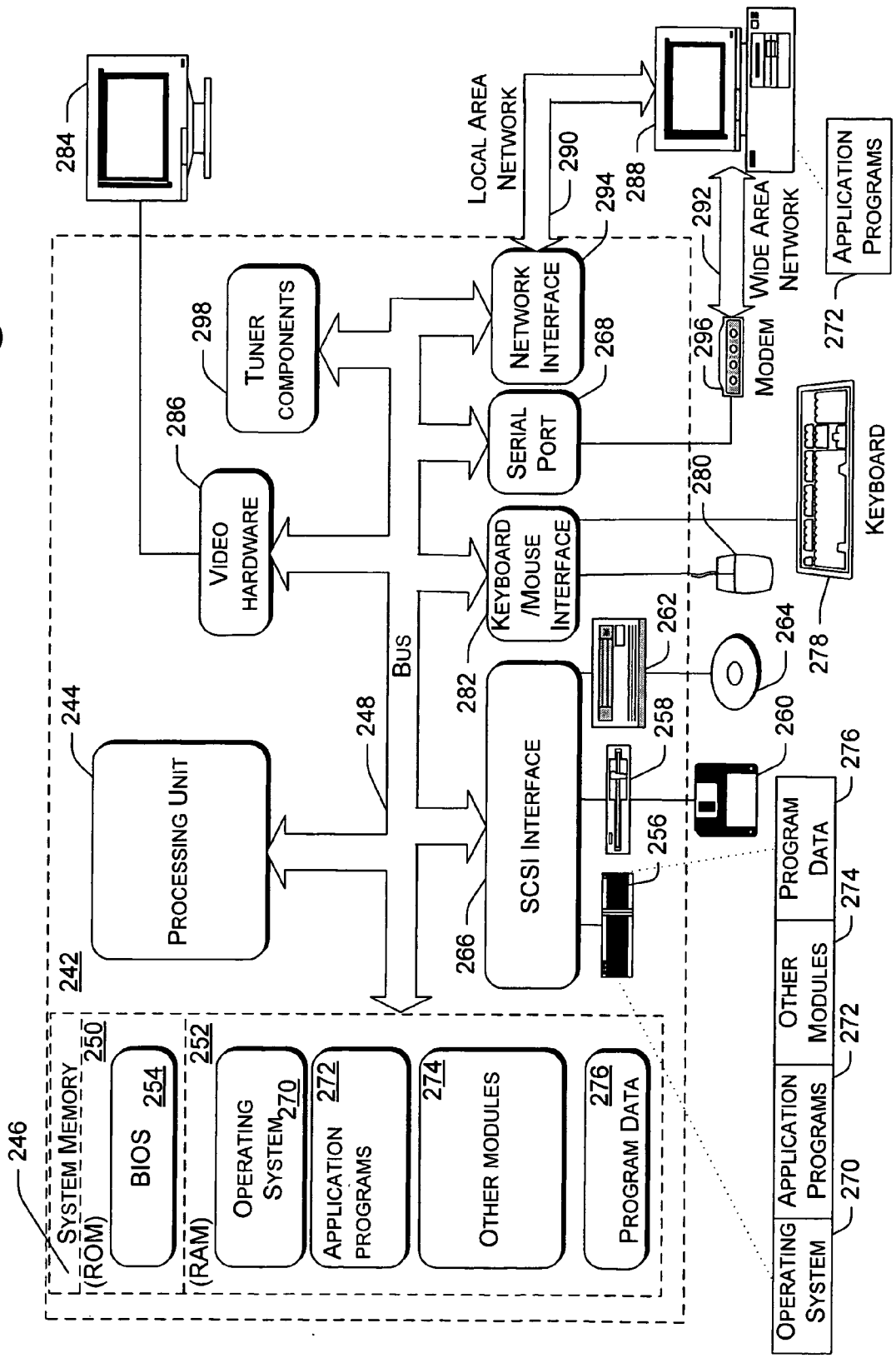
FIG. 2 illustrates exemplary systems, devices, and components in an operating environment in which software-based audio rendering can be implemented.

Although the various implementations may be incorporated into many types of operating environments as suggested above, a description of but one exemplary environment appears in FIG. 2 in the context of an exemplary general-purpose computing device in the form of a conventional computing device which is described in more detail at the end of this document under the heading "Exemplary Operating Environment".

Exemplary Implementations

FIG. 1 illustrates an exemplary system 100 for performing software-based audio rendering and/or software-based video rendering. System 100 includes a computing device 102, such as a PC, coupled to a display device 104. Computing device 102 can also be coupled to a network, such as the internet, as indicated generally at 106.

Figure 5:
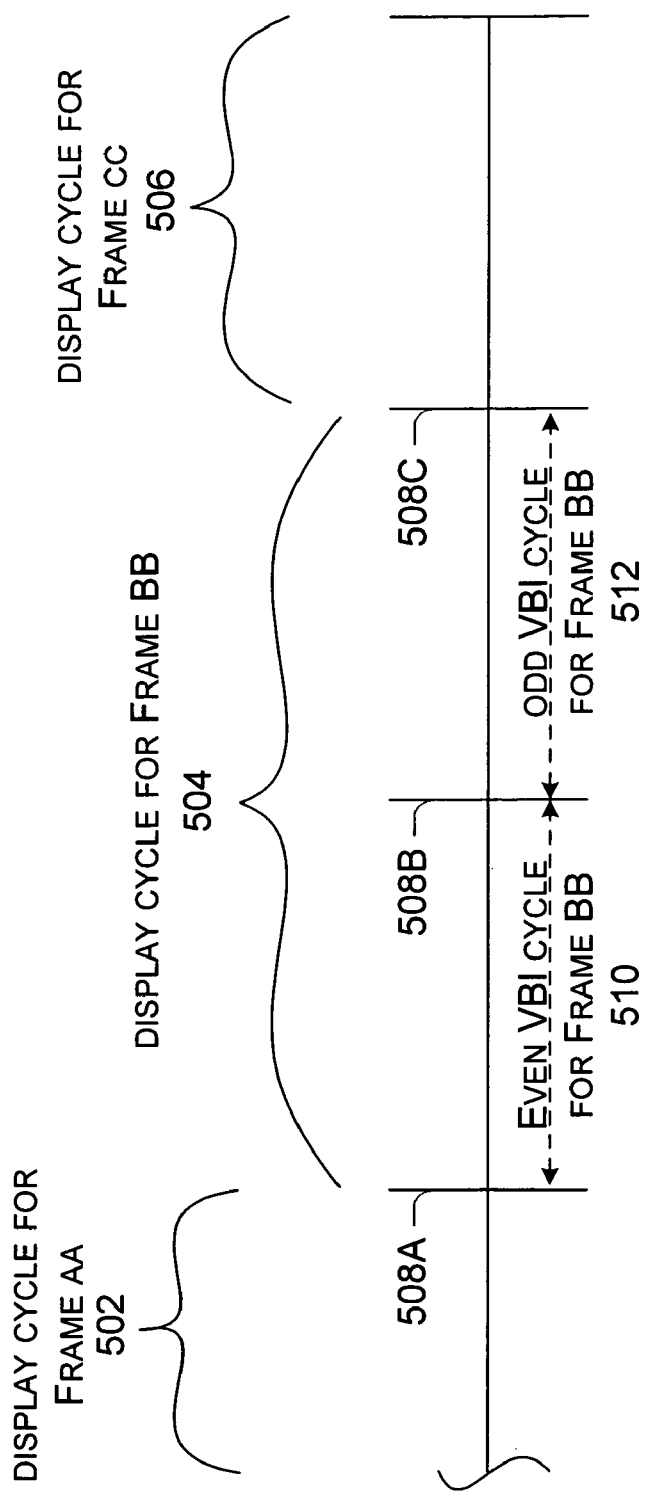
FIGS. 5-6 illustrate representations of a timeline and events associated with exemplary software-based video rendering implementations.

Computing device 102 can include a source 110, a parser 112, an audio decoder 114, two audio buffers 115A, 115B, a software-based audio rendering engine 116, and audio hardware 118. The computing device also includes a software-based video decoder 120, two video buffers 122A, 122B, a software-based video rendering engine 124, graphics hardware 126, and a TV encoder 128. In this particular system configuration, parser 112, audio decoder 114, audio buffers 115A, 115B, audio rendering engine 116, video decoder 120, buffers 122A, 122B, and video rendering engine 124 are implemented as software modules. These modules are stored in memory and executed by one or more processors. The memory and processor(s) are not explicitly illustrated in FIG. 1, but one exemplary configuration of such a computing system is shown in FIG. 5.

Source 110 represents a local store of video and/or audio content, where the content is stored in various formats. The source 110 may be implemented as a data storage or memory device. Alternatively or additionally to the source 110, the computing device 102 may also access an external source via network 106. Parser 112 is configured to recognize various data formats of the audio and/or video content received from source 110 or via network 106. The parser 112 distributes audio data to the software-based audio decoder 114 and video data to software-based video decoder 120.

Audio

Digital audio content can be thought of as multiple samples configured to be processed at a given source rate to cumulatively produce sound for a user. The source, such as source 110, provides audio samples at the given source rate in accordance with a source or external clock (not specifically designated). For instance, if a given source rate is 1,000 samples per second or Hertz (Hz), then the source produces the samples at a rate of 1,000 hz according to the source clock. Source rates commonly run in the 20,000 to 50,000 hertz range, though other source rates are suitable with the techniques described below. With such a high number of samples per second humans cannot generally detect an individual sample. This fact can be used advantageously for audio clock synchronization as will become apparent below.

The audio decoder 114 decodes the audio samples produced by the source and makes individual decoded samples available to audio rendering engine 116 via audio buffer 115A. The audio samples can be rendered to audio hardware 118. The audio hardware has a processing cycle set according to the given source rate. For example, where the source rate is 1,000 samples per second then the audio hardware's processing cycle is set so that 1,000 audio samples are consumed per second. The audio hardware may not have a readable clock time per se, but the hardware's processing rate can be determined as samples consumed per unit time on the external clock or as samples produced at the source over samples consumed by the audio hardware.

Software-based audio rendering engine 116 utilizes an audio clock to time the audio rendering process. The audio clock rate is derived from the number of samples consumed by the audio hardware per unit time. Software-based audio rendering engine 116 is configured to track or measure the audio clock relative to the external clock. The software-based audio rendering engine can further take an action to reduce any cumulative drift between the audio clock and the external clock. So for instance, assume that a source presentation time is one hour. The software-based audio rendering process can take an action to reduce cumulative drift between the audio clock and the external clock over the course of the one hour play duration even though the two clocks may or may not be exactly synchronized at a particular instantaneous point in time during the one hour duration. Further, as will be described below, rather than trying to exactly match the audio clock to the measured rate, the audio rendering engine can manipulate the audio clock such that the audio clock rate oscillates around the measured rate to effectively cancel out any cumulative drift.

More detailed examples of processes that the software-based audio rendering engine can implement to reduce cumulative drift between the audio clock and the external clock are described below in relation to FIGS. 3-4.

Video

Software-based video decoder 120 receives the video content from the parser 112 and decodes individual frames of the video content. The software-based video decoder 120 buffers decoded frames in buffer 122A. Software-based video rendering engine 124 accesses buffer 122A and renders the decoded frames placed in buffer 122A by video decoder 120. Once a frame is rendered, the software-based video rendering engine outputs the rendered frame to graphics hardware 126. The rendered frame is also stored in buffer 122B, where it can be used by the video decoder 120 for decoding of downstream frames. In this particular system configuration, two buffers are employed. However, in other system configurations, more that two buffers may be used. Further, this particular system configuration utilizes two FIFO (first in, first out) buffers.

Buffers 122A, 122B allow software-based video rendering engine 124 to operate independently and asynchronously from software-based video decoder 120. The video decoder 120 can process and queue video frames at one rate, while the video rendering engine 124 extracts and processes the frames at a different rate. This allows the video decoder 120 to decode video frames at a rate which is faster than the video frame display rate. So, for example, if the display rate is 30 frames per second (fps), the decoder may decode 40 fps for a period of time. By allowing the decoder to accumulate buffer frames, this implementation can perform satisfactorily in instances where the software-based video decoder may not get enough CPU cycles to decode a video frame on time, due to a sudden surge of other software modules having higher priority activities. The extra buffered frames can reduce this occurrence by allowing software-based video decoder 120 to decode a few more video frames ahead of time to compensate for such a situation.

Software-based video rendering engine 124 renders individual video frames to the graphics hardware 126. The graphics hardware presents the rendered frame to TV encoder 128. The TV encoder scans the video frame and presents the data in a form utilized by the display device 104 for generating the image. A sequential series of images creates user-perceptible motion video.

In compliance with NTSC standards, the display device 104 and the TV encoder 128 follow a defined display cycle to display each frame for two scanning or VBI cycles. Within a display cycle, the first scanning cycle relates to an even field and the second scanning cycle relates to an odd field. Each scanning cycle lasts for a duration of time specified by the standards. In the first scanning cycle, an image is created from the even field of the frame and in the second cycle, an image is created from the odd field which is interlaced with the even field. In the even field, TV encoder 128 scans the even lines of the frame and in the odd field, the TV encoder 128 scans the odd lines of the frame.

For every field, TV encoder 128 scans the lines starting at the top left of the screen and scans horizontally across every other line in turn until it reaches the bottom right of the screen. Upon reaching the bottom right, the TV encoder 128 goes through a non-scanning vertical blanking interval (VBI) event as it returns from the bottom right corner of the display to the top left. Each field is displayed for one scanning or VBI cycle where a VBI cycle is defined as spanning from one VBI event to the next VBI event. According to NTSC standards, each VBI cycle lasts 16.67 milliseconds (ms). Since each frame is displayed for two VBI cycles, the frame's display cycle is 33.34 ms.

Synchronizing Audio and Video Output for the User

Software-based audio rendering engine 114 and software-based video rendering engine 124 allow system 100 to synchronize corresponding audio and video for the user. For instance, the software-based video rendering engine can determine an actual time at which an individual video frame will enter a display cycle where it is scanned for display on the display device. The software-based video rendering engine can convey this time to the software-based audio rendering engine which can then render corresponding audio samples at an appropriate time so that the sound production corresponds to the visual image. Such processes are described below at least in relation to FIGS. 8-9.

Exemplary Operating Environment

FIG. 2 shows an exemplary computing device that can be used to implement the software-based video rendering process described above. Computing device 242 comprises one or more processors or processing units 244, a system memory 246, and a bus 248 that couples various system components including the system memory 246 to processors 244. Multi-threading techniques can be employed on the one or more processors to allow parallel processing of multiple tasks.

The bus 248 represents one or more of any of several types of bus structures, including a memory bus or memory controller, a peripheral bus, an accelerated graphics port, and a processor or local bus using any of a variety of bus architectures. The system memory 246 comprises read only memory (ROM) 250 and random access memory (RAM) 252. A basic input/output system (BIOS) 254, containing the basic routines that help to transfer information between elements within computing device 242, such as during start-up, is stored in ROM 250.

Computing device 242 can further comprise a hard disk drive 256 for reading from and writing to a hard disk (not shown), a magnetic disk drive 258 for reading from and writing to a removable magnetic disk 260, and an optical disk drive 262 for reading from or writing to a removable optical disk 264 such as a CD ROM or other optical media. The hard disk drive 256, magnetic disk drive 258, and optical disk drive 262 are connected to the bus 248 by an SCSI interface 266 or some other appropriate interface. The drives and their associated computer-readable media provide nonvolatile storage of computer-readable instructions, data structures, program modules and other data for computer 242. Although the exemplary environment described herein employs a hard disk, a removable magnetic disk 260 and a removable optical disk 264, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 256, magnetic disk 260, optical disk 264, ROM 250, or RAM 252, including an operating system 270, one or more application programs 272 (such as a user agent or browser), other program modules 274, and program data 276. A user may enter commands and information into computer 242 through input devices such as a keyboard 278 and a pointing device 280. Other input devices (not shown) may comprise a microphone, joystick, game pad, satellite dish, scanner, or the like. These and other input devices are connected to the processing unit 244 through an interface 282 that is coupled to the bus 248. A monitor 284 or other type of display device is also connected to the bus 248 via an interface, such as video hardware 286. In addition to the monitor, personal computers typically comprise other peripheral output devices (not shown) such as speakers and printers.

Computer 242 commonly operates in a networked environment using logical connections to one or more remote computers, such as a remote computer 288. The remote computer 288 may be another personal computer, a server, a router, a network PC, a peer device or other common network node, and typically comprises many or all of the elements described above relative to computer 242. The logical connections depicted in FIG. 4 comprise a local area network (LAN) 290 and a wide area network (WAN) 292. Such networking environments are commonplace in offices, enterprise-wide computer networks, intranets, and the Internet.

When used in a LAN networking environment, computer 242 is connected to the local network through a network interface or adapter 294. When used in a WAN networking environment, computer 242 typically comprises a modem 296 or other means for establishing communications over the wide area network 292, such as the Internet. The modem 296, which may be internal or external, is connected to the bus 248 via a serial port interface 268. In a networked environment, program modules depicted relative to the personal computer 242, or portions thereof, may be stored in the remote memory storage device. It will be appreciated that the network connections shown are exemplary and other means of establishing a communications link between the computers may be used.

The computer could also contain analog or digital tuner components 298. The tuner components can be linked to the system either through an internal or extended bus such as PCI or external bus such as USB bus, IEEE-1394 bus. The tuner components allow the system to receive broadcasting TV through standard TV broadcasting media such as terrestrial, cable, and satellite.

Generally, the data processors of computer 242 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein comprises these and other various types of computer-readable storage media when such media contain instructions or programs for implementing the blocks described, in conjunction with a microprocessor or other data processor. The system described can also comprise the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Although embodiments relating to software-based video rendering have been described in language specific to structural features and/or methods, it is to be understood that the subject of the appended claims is not necessarily limited to the specific features or methods described. Rather, the specific features and methods are disclosed as exemplary implementations for software-based video rendering.

Exemplary Audio Rendering Implementations

FIG. 3 illustrates an exemplary software-based audio rendering process for limiting cumulative drift between an external clock and a software-based audio render clock generally at 300.

At act 302 the software-based audio rendering process ascertains the source sample rate. The source generally contains some reference indicating the source sample rate which is the rate at which the source samples are configured to be presented. For example, a common source sample rate is 44.1 kilohertz (KHz). If the source sample rate is 44.1 KHz then the source should produce the samples at 44.1 KHz relative to the source or external clock and the audio hardware should process the samples at 44.1 KHz relative to the audio hardware clock.

At act 304 the software-based audio rendering process selects a drift threshold (herein after "threshold") between the external clock and a software-based audio render clock utilized by the software-based audio rendering process. The threshold should be large enough to provide an accurate measurement of the clock difference between the external clock and audio hardware clock but small enough to not produce a noticeable lip sync problem. For example, in one but one instance a threshold of 16 ms is utilized.

At act 306 the software-based audio rendering process measures the software-based audio render clock rate relative to the external clock rate. Playback of the source is started such that samples are produced at the source, decoded, rendered, and then processed on the audio hardware. In one implementation, the software-based audio rendering process tracks a rate at which samples are consumed by the audio hardware relative to a rate at which the samples are produced by the source. Utilizing the measured difference, the process decides upon a rate adjustment to be utilized when manipulating the audio clock rate at a subsequent act in the process. Rate adjustment is described in more detail in relation to an algorithm discussed below. For the sake of simplicity in the following discussion, assume that a value for the rate adjustment is decided for this example as 1 sample per second.

At act 308, the software-based audio rendering process tracks a first condition until drift between the reference clock and the audio clock reaches the threshold value.

For purposes of explanation consider FIG. 4 in combination with FIG. 3. FIG. 4 illustrates a graphical representation of an exemplary software-based audio render clock synchronization process generally at 400. An external clock time is indicated generally by line 402. A software-based audio render clock time is indicted generally by line 404. Assume for purposes of example that in response to a user 'play' command the audio clock and the external clock start simultaneously at time zero indicated at 406.

Assume, also for purposes of explanation, that the source rate is 1,000 hertz. At the end of one second on the external clock the source has presented 1,000 samples. Similarly, the hardware consumption rate is set such that the audio hardware should process 1,000 samples in one second. However, assume that at the end of one second on the external clock, the audio hardware has consumed 1,002 samples. So relative to the reference clock rate the measured rate is two samples per second faster than the reference clock. As such, the audio clock drifts away from the external clock at a measured rate of two samples per second. Such an instance is illustrated generally by a first condition 408 which culminates in the drift reaching the threshold value 410 after 5 seconds.

Responsive to the drift reaching the first threshold value, at act 308 the software-based audio rendering process can take a responsive action which overcorrects the drift of the first condition at act 310. For example, the software-based audio rendering process can manipulate the audio clock rate to cause drift in the opposite direction from the first condition and toward a second threshold, which has an opposite polarity from the first threshold. For ease of explanation this example utilizes the same threshold magnitude of 10 for both the first and second thresholds. Other implementations will utilize a second threshold magnitude which is smaller than the first threshold magnitude.

In this instance the process manipulates the audio clock rate to achieve the rate adjustment value of one frame per second determined at act 306. In this instance, the software-based audio rendering process over-compensates for the drift of the first condition by creating a second condition indicated generally at 412 where the audio clock rate is slower than the measured clock rate. In the second condition the software-based audio render clock effectively drifts in the opposite direction as the first condition, but at a slower rate until the magnitude of the drift away from the measured rate again equals the predetermined value but in the opposite direction.

So for example, in the period starting with the sixth second, the software-based audio rendering process over-compensates by rendering some of the 1,000 frames received from the source twice such that more samples are rendered to the audio hardware in a one second span. Rendering samples multiple times can be termed 'insertion' since the affect is to create extra samples to be consumed during a sample period. As determined earlier, the audio hardware can process 1,002 in the one second. As such, the software-based rendering process manipulates the audio clock by inserting three extra samples by rendering three of the frames two times. Now the audio clock has an effective clock rate which is slightly slower than the measured rate. In second condition 412, the software-based audio render clock drifts back toward the external clock from seconds 5-15 at which point drift will start to accumulate in the opposite direction as occurred in the first condition. At 25 seconds into the process, the drift will again reach the threshold value 410 having a magnitude of 10, but the value of the magnitude is opposite that of the first condition which indicates the drift is in the opposite direction from the first condition.

At act 312 and responsive to reaching the threshold value in the second condition, the audio clock rate can be manipulated such that the drift oscillates back toward the first condition. In this instance the audio clock rate can be manipulated to be faster than the measured rate by an amount consistent with the adjustment factor. For instance, such manipulation can entail decimating frames in subsequent seconds. Decimating can simply mean dropping a number of frames within a unit time that would otherwise be rendered.

In this manner, the above acts of inserting and decimating can serve to oscillate the audio clock rate around the measured rate. As a result, cumulative drift between the audio clock rate and the measured rate is reduced or eliminated. The algorithm described below provides a refined implementation where the drift adjustment value can be adjusted to a more precise extent than described here.

Exemplary Algorithm

The following algorithm can be utilized by the software-based audio rendering process to reduce or eliminate drift between the external clock and the software-based audio render clock. The algorithm can eliminate cumulative drift between a software-based audio render clock and an external clock by alternating between a first condition where the audio clock is slower than the external clock and a second condition where the audio clock is faster than the external clock.

A software clock implementation based on a hardware clock cannot be perfect as it is limited by, among other factors, resolution, accuracy, and error accumulation. Recognizing this, the following software clock synchronization algorithm allows the audio clock to drift between plus/minus values (opposite polarities) of a predetermined magnitude against the external clock. Such an implementation can provide a degree of immunity from deleterious factors mentioned above. In some instances, the software clock synchronization algorithm may provide complete immunity from all such factors. Such implementations stand in contrast to previous attempts to react to any drift with an immediate correction response. These previous techniques do not work well since the drift value is measured over a very short period of time and as such is highly unreliable. At least one significant shortcoming of the prior solutions is that software clock implementations have jitters that are typically a few magnitudes larger than the drift measured over a very short period of time. This often leads to false and disproportionally large reaction that significantly reduces the audio rendering quality.

In order to provide proportional and nearly symmetric correction to the clock drift, the audio rendering rate should be measured against the external clock over a suitably long period to produce a measured drift rate (measured rate). The measured rate can then be utilized in subsequent drift corrections by adjusting the audio hardware play rate, or by adjusting the audio sampling rate (using audio re-sampling techniques). The latter technique is almost equivalent to that of the former. Yet audio re-sampling is independent of the underlying audio hardware and as such reduces or avoids possible audio hardware limitations such as rate adjustment resolution and maximum hardware rate. In the following discussion, an audio sampling rate adjusting technique is discussed. However, an algorithm is described which is applicable for adjusting a hardware play rate where the audio hardware does not impose limitations such as those mentioned above.

As described above, upon playback, the software-based audio rendering process measures drift of the software-based audio render clock relative to the external clock until the drift reaches a first threshold value. The process then utilizes the following equations:

$$\Delta S \times T = \Delta T \times S_a \quad (1)$$

In equation (1), $\Delta S$ is the audio source rate multiplied by the difference in clock rates between the software-based audio render clock and the external clock, T is the time when the drift exceeds the threshold value, $\Delta T$ is the threshold value, and $S_a$ is the audio sampling rate. A threshold value which is large enough to provide a good measurement of any difference between the two clocks but small enough not to make lip sync an issue should be selected.

Therefore, according to the external clock, the audio hardware is presenting audio at a rate $S_m$ where:

$$S_m = S_a + \Delta S \quad (2)$$

This equation is in the context of the audio hardware play rate. If the audio hardware play rate is set at the source audio rate, then the adjusted play rate is $\Delta R = \Delta T/T$.

For purposes of explanation assume that the software-based audio render clock is slower than the external clock though the following mathematical equations are independent of the assumption. Based in this assumption, then $\Delta S<0$. Since $\Delta S$ could be very small, the following algorithm is configured to utilize integer and fixed point math for computation. As such, the process scales a right shift into the values. In the present example, a right shift value of 8 is utilized, which is equivalent to multiplying the values by 256. This right shift allows rate re-sampling of original audio to a rate that is as small as 0.004 Hz. From this point until the end of the example, all S values are considered scaled by 256.

In an instance where the software-based audio render clock is slower than the external clock, the exemplary software-based audio rendering process re-samples the audio data to a lower rate than the original sampling rate. Thus it makes the audio hardware appear to play at a higher rate to reverse the direction of the audio clock drift. When re-sampling audio samples to lower rates the process drops or decimates a certain number of samples during the sample period.

The audio hardware still consumes samples at the same rate. However, the audio hardware consumes less of the total content associated with the sample period. For example, assume an audio source rate is 1 KHz. Accordingly, one second contains 1,000 samples. The audio hardware should process 1,000 samples in one second according to the audio hardware clock. But assume that in relation to the external clock the audio hardware only can process 999 samples in the one second. If the process dropped one sample from the one second's worth of content, then the audio hardware only needs to consume 999 samples of the corresponding content in the one-second time period of the external clock and the time it expends in consuming this 999 samples is exactly 1 second.

Taking this action effectively makes the audio hardware play one second of content in one second, according to the external clock. Of course, the content is not exactly the same, since one sample out of the thousand was not processed for the user. Other algorithms could also be employed, thought such algorithms may utilize more processing resources than the insertion re-sampling algorithm described in this example. For instance a one-dimensional signal rate re-sampling algorithm uses low pass filter such as Finite Impulse Response (FIR) filter of 3 to 5 tap is able to make rate re-sampled audio to provide a satisfying user experience.

The human ear can only hear sound that has frequency components between about 30 Hz to about 20,000 Hz. Most human speech is primarily below 3,000 Hz. The human ear becomes much less sensitive to sound as the frequency approaches 20,000 Hz. Most consumer quality digital audio is sampled at the 44,100 hertz (Hz) or above rather than the 1,000 Hz which is selected here primarily for ease of explanation. This is hardly accidental since Nyquist theory states that a sampled sound signal can reproduce any sound whose frequency is less than half of the sampling rate. This means that 44,100 Hz sampled audio can exactly reproduce frequency component up to 22,050 Hz, well beyond the human audible frequency range.

In the case of synchronization of audio rendering with an external source, the clock difference between audio render hardware and external source is at most several hertz and often a tiny fraction of a hertz. Therefore, using simple duplication or decimation of a single audio sample out of several thousands or tens of thousands of audio samples is far more efficient than, and will achieve nearly equivalent quality as that of using a low pass filter for consumer quality audio. As an illustration, for a 44,100 Hz digitally sampled audio, an audio sample lasts a little less than 23 microseconds. Assume that the process drops a sample out of a few thousand samples, either this audio sample is in a region where its adjacent neighbors are close to its value, or one or both of its two adjacent neighbors is very different from it. In the former case, dropping the sample hardly makes any distortion of the wave form from a human sensory perspective. And in the latter case, the dropped sample is of such a high frequency signal, which changes dramatically in a very short time, that the sample is almost not audible to humans in the first place.

In some configurations the audio hardware may not have an easily readable time. Instead, the audio time can be derived from its Direct Memory Access (DMA) cursor position. The DMA cursor points to where the audio hardware is obtaining audio samples in the DMA buffer provided by the audio software, such as may be provided by audio driver software. This allows an audio driver to determine how many audio samples the audio hardware has processed at the time the DMA cursor is read. An audio time increment is derived from a number of audio samples consumed by the audio hardware at the audio sample rate. During a period j where the audio hardware consumed an amount of audio samples $\Delta A_j$ at an audio sample rate $S_j$ the audio time in this period is computed from:

$$\delta t_j = \Delta A_j / S_j \quad (3)$$

Therefore, the total audio time of the software-based audio rendering process since entering into a running state is:

$$t = \sum_j \Delta A_j / S_j \quad (4)$$

As such equation 4 is summation of equation 3 for every j.

This particular algorithm manipulates the audio hardware play rate to reduce drift between the software-based audio render clock and the external clock in a similar manner to using rate re-sampling. However, with this particular algorithm, when the hardware audio play rate is changed, the rate at which the audio hardware consumes audio samples is physically changed. To this point, just before the audio rate is changed, the audio samples which have been consumed up to that point are read to determine the amount of consumed audio samples ($\Delta A_j$). As with software rate re-sampling, equation 4 is used to compute the audio time.

However, the measured rate may still have some small degree of error. Audio rate re-sampling, especially using fixed point math with no more than 32-bits has limited precision. As a result, a computation rounding error may accumulate. Similarly, the external clock has a certain amount of jittering that could be as large as 2 milliseconds, because of software execution latency, among other factors. This software latency may result from latency caused by the operating system and/or applicable application program interfaces, among other causes. By configuring the algorithm to swing slowly around a perfect synchronization point between the audio clock and the external clock the algorithm reduces or is immune to these errors. Described another way, the audio rate is:

$$S_c = S_m \pm \delta S_c \quad (5)$$

where $\delta S_c$ is the smallest positive value that guarantees that when using $S_m + \delta S_c$ that the audio clock is slightly faster than the external clock and that when using $S_m - \delta S_c$ that the audio clock is slightly slower than the external clock and that the following conditions are met. This particular algorithm is configured so that the audio clock drifts between positive and negative values of the predefined threshold. The error accumulated in forward or positive drift will cancel the error accumulated in the backward or negative drift. Therefore, the algorithm reduces or eliminates accumulation error. As such, values can be selected such that the drift time between the positive and negative of the threshold value are not long enough for any fixed point error accumulation to become significant.

The audio clock time after the process obtains $S_m$ is calculated by $\delta S_0 = \text{sign}(\Delta S) \times \Delta S/2$. Where dividing by 2 is equivalent to a left shift of the integer value. As such:

$$S_j = S_m + (-1)^{j+1} \times \text{sign}(\Delta S) \times \delta S_j \quad (6)$$

and $$\delta S_{j+1} = \delta S_j / 2 \quad (7)$$

where $j < c$ and $$\delta S_j = \delta S_c \quad (8)$$

where $j \geq c$.

At $j=0$, the $(-1)^{j+1} \times \text{sign}(\Delta S) \times \delta S_j > 0$, the equivalent play rate is faster than the external clock rate. As such the audio clock will drift from a negative value toward a positive value. The audio resample interval is $\lambda_j$ and is computed from:

$$\lambda_j = S_a / |S_a - S_j| \quad (9)$$

and the remainder of the one decimation if $S_j > S_a$ and the insertion if $S_j < S_a$ is:

$$\gamma_j = 1.0 \times S_a / |S_a - \delta S_j| - \lambda_j \quad (10)$$

The re-sampling process uses the fixed point computation to find where to insert or decimate a sample. Assuming A is set to zero when j is incremented, at which point the audio render process sets the re-sampling rate to reverse the drift direction. Whenever the audio render process receives a new audio sample buffer that contains L samples, $A=A+L$. If A is greater than or equal to the audio resample interval ($\lambda_j$) then the process subtracts $\lambda_j$ from A, such that $A=A-\lambda_j$. Assuming $\rho$ is the accumulated remainder and it is set to zero when A is set to zero, then the process adds $\gamma_j$ to $\rho$. If at this point $\rho$ is larger than or equal to scaled 1 (256 in this case), the process inserts/decimates a sample at (A+1)-th sample and set $\rho = \rho - 256$. Otherwise, the process inserts/decimates A-th sample. This process continues on until $A < \lambda_j$. Then the software-based audio rendering process waits for next audio sample buffer to arrive from the audio decoder. This process is repeated until the audio rendering process decides to reverse the drift direction again, e.g. increment j again.

In some implementations, with equation 6, the process starts at $j=0$, with the audio clock rate drift going from a negative value to 0. At this point the process sets a maximum drift value as the threshold. The process also gives the threshold a margin such that when the process starts to reverse the drift direction, it allows the audio to continue to drift a little bit beyond the threshold. This is because the re-sampled audio data at the previous rate (j−1) may not be consumed entirely by the audio hardware at this time. Once the audio drifts to a positive value that is larger or equal to the newly and finally set maximum drift value, the process increments j to a value of 1. At this point, the audio play rate appears slower than $S_m$. The audio starts to drift toward a negative value. Since the value of $\delta S_1$ is half of the value of $\delta S_0$ the time the drift takes is roughly twice the time to drift to the negative threshold value. This process will repeat until the increment of j no longer reverses the drift direction, which means that the incremental value is not enough to compensate for the errors introduced by software implementations of the audio clock. At such a time as the above process fails to reverse the drift direction, then $c=j-1$ is the last time the process tries to reduce the $\delta S$ and the convergent value $\delta S_c$ is reached.

As mentioned initially, the process also places the limit on audio clock drift between the positive threshold value and that of negative or vice versa to a certain time span, say for instance 15 minutes, to make the algorithm more immune to accumulation of effects from various sources. This may effectively place the minimal value of $\delta S_c$ under certain situations before the $\delta S_c$ described in previous paragraph is reached. By that it means the process will set $c=j$ when the time span is beyond 15 minutes, for instance, such that $\delta S_j$ will no longer be halved. It is possible that $\delta S_c$ may have to be larger than $\delta S_0$ such as $2^n \times \delta S_0$ if $\Delta S$ is extremely small. Another condition is that maximum sampling interval is limited to $2^{31} \geq S_a / |S_a - S_j|$ so that 32-bit fixed point math can always be used for audio rate re-sampling. Based on equations 2 and 6, it may also place the limit on minimal value of $\delta S_c$. It is possible that $\delta S_c$ may have to be larger than $\delta S_0$ such as $2^n \times \delta S_0$.

To summarize then, for this implementation, an adjusted rate change, or rate adjustment delta, from the measured rate should be of a minimal value that allows the audio clock to continuously drift between plus and minus values of the threshold against the external clock while the time the audio clock takes to drift between, say the negative threshold value to the positive threshold value is large but not too large. For instance, a period of about a minute to an hour or more, among other values, can provide suitable implementations. The criteria for the convergent rate adjustment delta is utilized to guard against a situation where the audio clock seems to be in perfect sync with the external clock but where the condition actually results from imperfections of the software clock implementation. The nearly symmetric correction mentioned above means that when the final rate adjustment delta is determined, the time the audio clock drifts from a negative threshold value to the positive threshold value is about the same as the time the audio clock takes to drift from the positive threshold value to the negative one.

Exemplary Video Rendering Implementations

For purposes of explaining display cycles, consider FIGS. 1 and 5 collectively. FIG. 5 represents a timeline 500 of display cycles of three consecutive video frames AA, BB, and CC that are tracked by the software-based video rendering engine 124 generally at 505, 504, and 506, respectively. In timeline 500, time progresses from left to right. As depicted at the left-most region of timeline 500, a display cycle of current frame AA is indicated generally at 502. As mentioned above, a display cycle comprises two scanning or VBI cycles; an even field is scanned in the first VBI cycle and then an odd field is scanned in the second VBI cycle. Each VBI cycle culminates in a VBI event which does not contribute to image generation.

VBI event 508A demarcates the end of display cycle 502 and the beginning of display cycle 504 of frame BB. Display cycle 504 includes a first or even VBI cycle 510 and a second or odd VBI cycle 512. In order for display cycle 504 to properly display an image from frame BB, the frame should be available for graphics hardware to render just before VBI event 508A.

The rendering process is sometimes referred to as surface flipping or flip-flopping where the new frame BB is flipped from a back buffer surface to a front buffer surface for access by the graphics hardware while the current frame AA is correspondingly flipped from the front to the back.

The display cycle 504 of frame BB consists of even VBI cycle 510 which culminates in VBI event 508B and odd VBI cycle 512 which culminates in VBI event 508C. In response to VBI event 508B, subsequent frame CC is rendered so that it can be scanned in display cycle 506, only the even VBI cycle of which is represented in FIG. 5.

In compliance with the standards, TV encoder 128 adheres to a defined scanning cycle or VBI cycle of 16.67 ms. The TV encoder does not intentionally deviate from this cycle or take into account the operation of other system components. For example, the TV encoder does not have any discretion to shorten or lengthen individual VBI cycles. Each display cycle comprises two VBI cycles or 33.34 ms. The VBI cycles of the graphics hardware 126 and the TV encoder 128 are maintained in relation to either a TV encoder clock or a graphics clock (not specifically designated) of the graphics hardware.

Software-based rendering engine 124 can include a software-based rendering clock (not specifically designated). By monitoring the display cycles of the TV encoder 128 and/or the graphics hardware 126, the rendering clock of the rendering engine 124 can schedule events relative to the display cycle of the TV encoder. One example of a process for monitoring the display cycle is described below with relation to FIGS. 5A-5B.

As shown in FIG. 1, software-based video rendering engine 124 receives video frames from a source which may be internal or external to computing device 102. The video frames can include presentation times or time stamps established by an external clock or reference clock, such as a source clock. External clocks, which create timestamps, are not aware of the display cycle of the TV encoder or even of the graphic hardware's clock. The software-based video rendering engine 124 monitors the display cycle of the graphics hardware 126 to predict the actual time that the frame can be displayed relative to the graphic hardware's display cycle. The video rendering engine 124 then determines when to render the video frame to the video hardware based on this prediction. Further, while the software-based video rendering engine can schedule rendering upon the prediction the software-based video rendering engine continues to monitor the display cycle to ensure that the video frame is rendered at the appropriate time.

Figure 6:
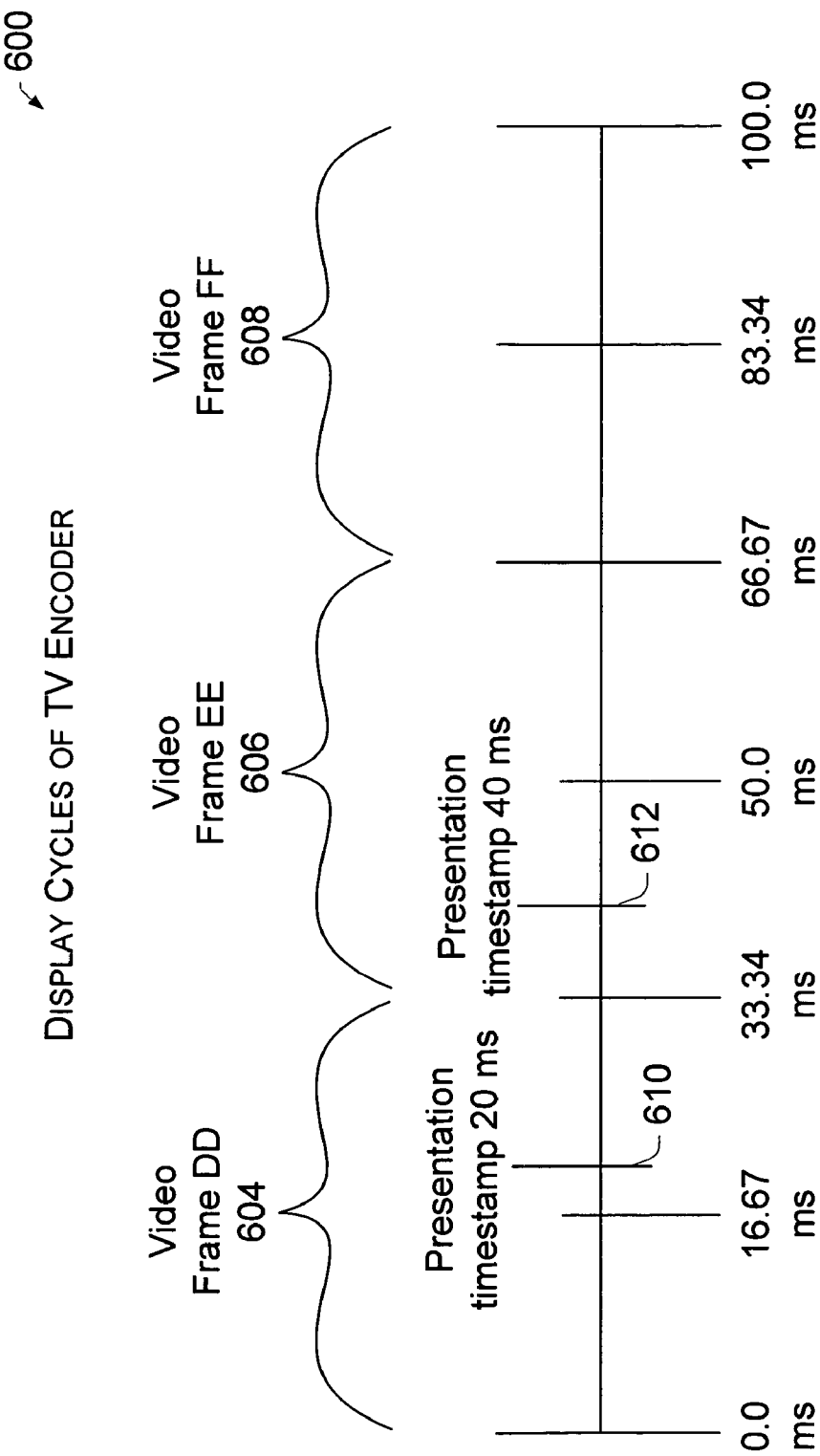

FIG. 6 illustrates one example where the rendering engine 124 determines an actual presentation time of individual video frames. A timeline 600 is depicted for a time duration of 100 ms. The timeline is demarcated in increments of 16.67 ms associated with a single VBI cycle. A consecutive set of two VBI cycles (or 33.34 ms) defines a display cycle, and three display cycles 604, 606, and 608 are shown in this example. The first display cycle 604 displays a video frame DD. The second display cycle 606 displays a second video frame EE and third display cycle 608 displays a third video frame FF.

Video frame EE has a presentation timestamp 610 of 20 milliseconds. Assume for purposes of explanation that the clock which established the timestamp is synchronized with the display cycle. From monitoring the TV encoder's display cycle, the software-based rendering engine 124 knows that video frame DD is being scanned from 0.0 ms until 33.34 ms and as such the actual presentation of video frame EE cannot be begin until after this time. As such, the software-based rendering engine knows that the actual presentation time of video frame EE should be the next display cycle 606 which starts at 33.35 ms and runs to 66.67 ms.

Similarly, video frame FF has a presentation time 612 of 40 ms. The software-based rendering engine knows that the next available display cycle 608 starts at 66.68 ms so the actual presentation time will begin then. The rendering engine can schedule to render video frame FF in the second half of display cycle 606. The software-based rendering engine does not schedule to render frame FF in the first half of display cycle 606 even though it may be closer to the timestamp presentation time 612 since undesirable results may be produced. Such undesirable results are described in more detail below in relation to FIGS. 5A-5B.

FIG. 6 illustrates how the software-based video rendering engine can determine actual presentation times for individual video frames and render them accordingly. Various system configurations may have some degree of latency on the rendering side and/or on the graphics hardware side. This latency can be factored in by some implementations to calculate even more accurate actual presentation times and/or to schedule rendering times. The software-based video rendering engine may also communicate the actual rendering time of an individual video frame to audio decoder 114 and/or audio rendering engine 116 so that audio rendering times may be adjusted accordingly.

As described above, the software-based video rendering engine can monitor the display cycle to determine rendering and/or presentation times of individual video frames if so desired. The software-based video rendering engine need not rely on these predetermined values as it continues to get real-time signals, such as the VBI signals, from the display cycle right up until it renders a video frame. Some implementations can ultimately render a video frame based upon the real-time signals rather than predetermined times.

By rendering video frames in accordance with the display cycle of the video hardware, a user-experience of the resultant motion video can be enhanced. Exemplary processes for monitoring the display cycle to determine when to render video frames is described below in relation to FIGS. 7A-7B.

Exemplary Video Rendering Processes

Figure 7A:
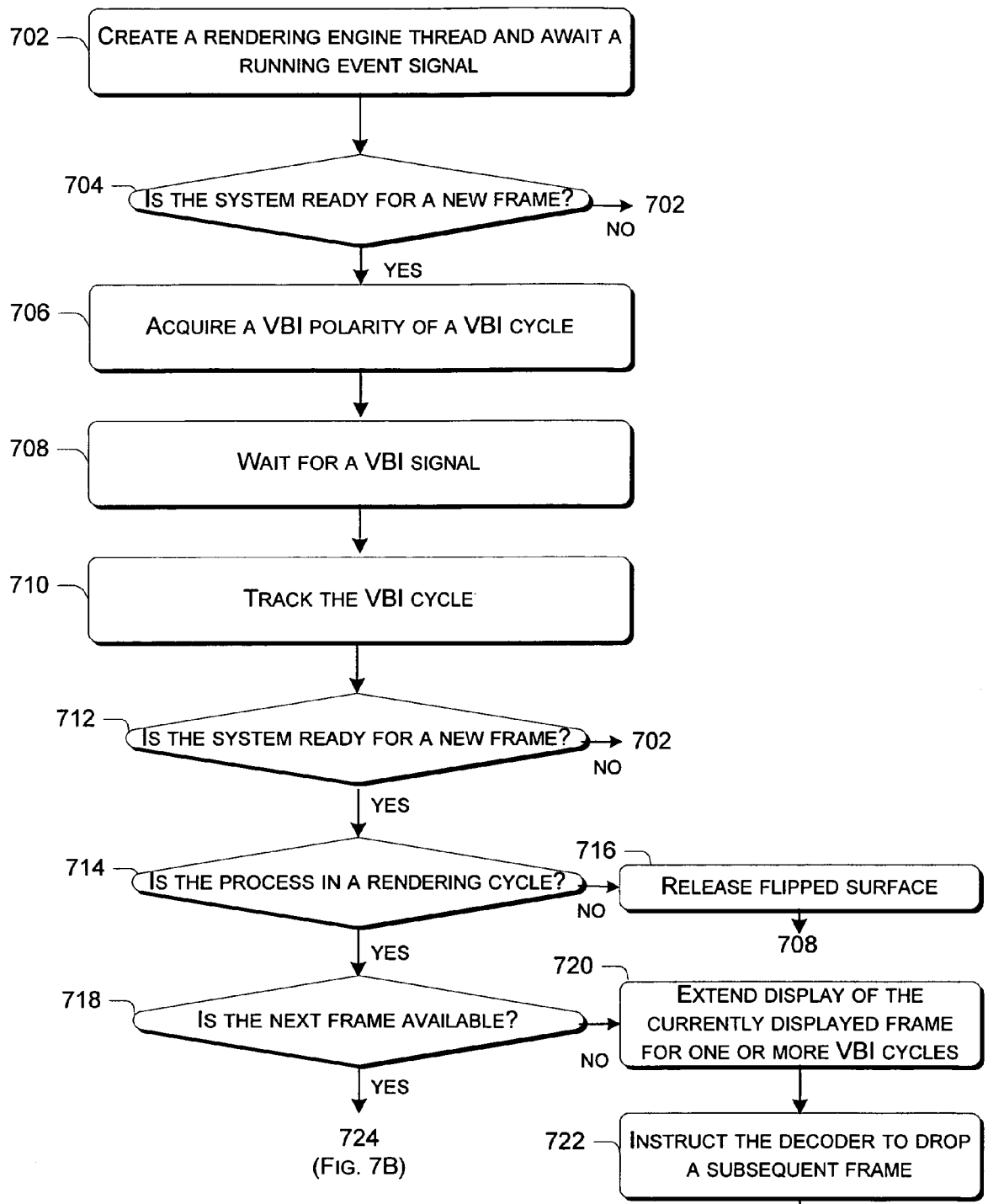
FIGS. 7A-7B comprise a flow diagram that illustrates an exemplary software-based video rendering process.
Figure 7B:
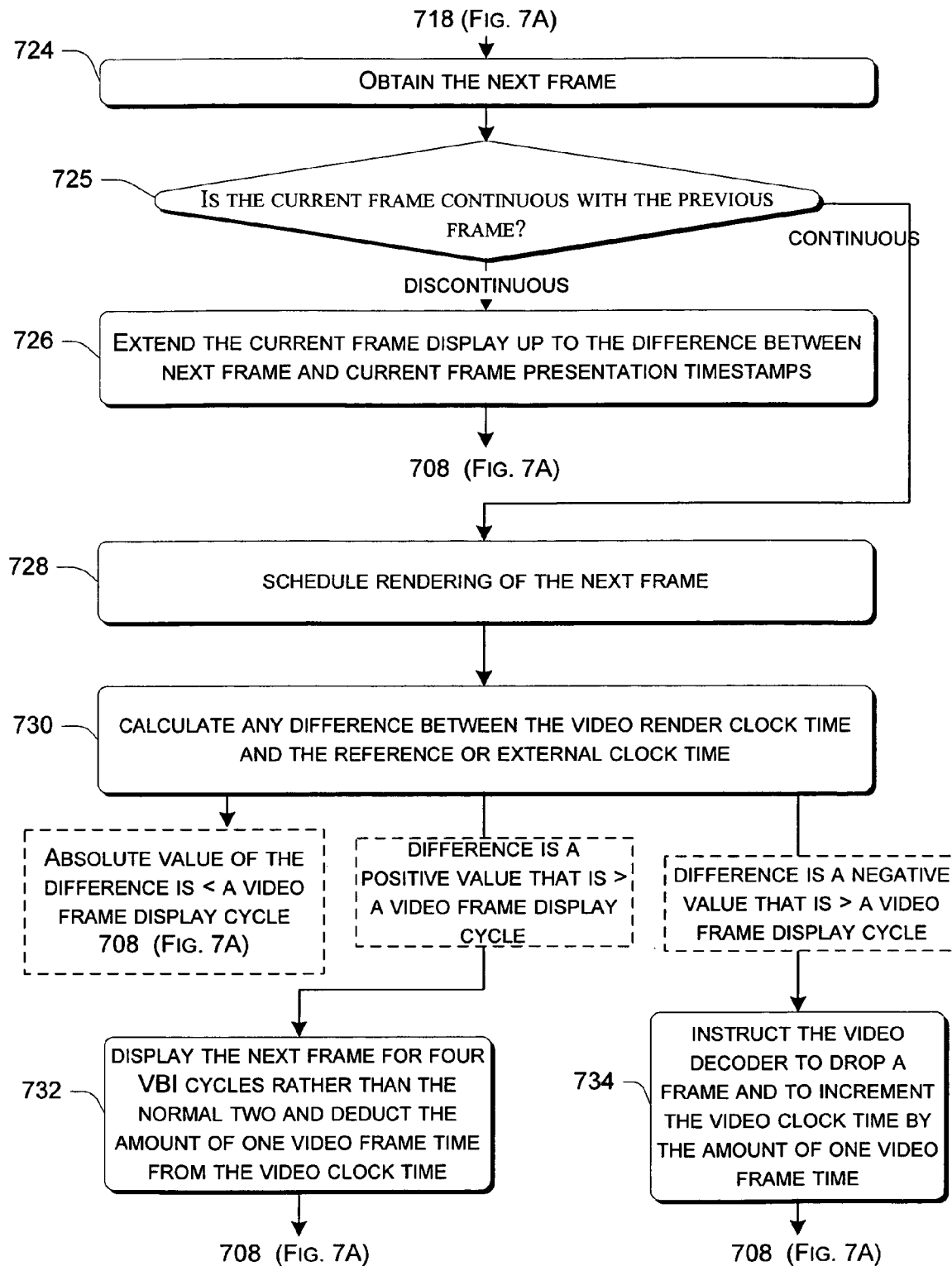

FIGS. 7A-7B represent a software-based process for rendering video data. This particular implementation is based upon standards established by the national television standards committee (NTSC) which is utilized in the United States among other countries. The concepts described below are applicable to other standards such as phase alternating line (PAL) which is utilized in Europe, digital versatile disk (DVD) and 480*p*, among others. In but one configuration, the process can be implemented using a system such as the ones described in relation to FIGS. 1 and 2. The described software-based video rendering process includes acts 702-734. Acts 702-724 generally relate to the video rendering process, while acts 726-734 generally relate to addressing potential clock drift between an external clock and a rendering process clock. The software-based video rendering process begins with a start-up process at act 702.

At act 702, the software-based video rendering process creates a video rendering engine thread in response to a media player application being opened by a user. The process then awaits a running event signal such as a play command from a user. The graphics hardware generates an interrupt signal when a particular interrupt line is encountered during VBI cycling. The interrupt signal interrupts the CPU. In response, the CPU notes the occurrence of the interrupt signal and the interrupt line which generated it. The CPU delivers the interrupt signal to a driver interrupt handler. The CPU examines a waiting thread queue and if the CPU identifies a thread which is waiting for the interrupt signal the CPU moves the identified thread from the waiting thread queue to a ready thread queue. In this instance, the rendering engine thread is waiting on the interrupt signal and is moved to the ready thread queue. The CPU will then examine the priority of the video rendering engine thread against any currently running thread and if the video rendering engine thread has priority the CPU will run the video rendering engine thread and move the current thread to the ready queue. The process then awaits arrival of a first video sample or frame from the video decoding process.

At act 704, upon arrival of a video frame at a buffer available to the software-based video rendering process, the process queries whether the system is ready for a new frame. This act allows the process to check a running state of the system to ensure that the video frame is in fact desired. This act reduces the chance that processing power and/or other resources will be wasted. For instance, a user may have pressed 'play' but by the time the process reached this point, the user may have pressed 'pause' or the user may have changed channels thereby eliminating the need to render the video frame. In this example, if the user pressed pause then the system is not ready for a new frame. If the video frame is not desired, then the process returns to act 702.

If the video frame is desired, the software-based video rendering process acquires a VBI polarity of a VBI cycle (act 706). VBI cycles occur on the hardware subsystem which operates in cooperation with a display device to create an image from a given video frame. Each video frame is displayed for a display cycle, which consists of two VBI cycles. The first or even VBI cycle scans the even field of the video frame. The second or odd VBI cycle scans the odd field of the video frame. By acquiring the VBI polarity, the process knows whether the display cycle of an individual frame is in the first VBI cycle or the second VBI cycle. Examples of display cycles and VBI cycles are described above in relation to FIGS. 2-3.

Suppose, for explanation purposes, the process acquires the odd VBI polarity. By acquiring the odd VBI polarity, the process knows that the second field of the current frame is being scanned by the TV encoder 128.

At act 708, the software-based video rendering process waits for the next VBI signal. As described above, a VBI event occurs at the end of a VBI cycle and indicates the start of a vertical blanking phase of the VBI cycle. The graphics hardware creates a VBI signal at each VBI event and this VBI signal is detected by the software-based video rendering engine. Receiving a VBI signal at the end of scanning the even field indicates that the next VBI cycle will have an odd polarity. Similarly, receiving a VBI signal after the odd field is scanned indicates that the next VBI cycle will have an even polarity. Accordingly, upon receipt of the VBI signal separating the even VBI cycle from the odd VBI cycle indicates that the display cycle of the current frame will be complete just before next VBI signal. By acquiring the VBI polarity and waiting for the VBI signal, the software-based video rendering process can schedule to render the next frame in the approaching odd VBI cycle.

At act 710, the software-based video rendering process tracks the VBI cycle. By tracking the VBI cycle, the process need not re-ascertain the VBI polarity which may take more time than a single VBI cycle to acquire. By acquiring the VBI polarity initially and than tracking the VBI cycle, the software-based video rendering engine knows the points of each display cycle relative to the video rendering engine's video rendering clock. Among other advantages, this feature can allow the software-based video rendering engine to avoid the possibility of rendering a new frame when only the even cycle of the current frame had been scanned. Lacking such a technique, some existing processes can lead to a scenario where a new frame is scheduled to be rendered during the even field VBI cycle causing the second or odd cycle of the current frame to be omitted with the new frame scanned in its place. Such a scenario can lead to a less pleasing user experience. In such an instance, the new frame may be scanned in a reverse temporal order. For example, odd field then even field, rather than even field then odd field, which can further decrease user satisfaction.

Further, by tracking the VBI cycle, the software-based video rendering engine can update the video rendering clock accordingly, since each VBI cycle takes exactly 16.67 ms, based on the graphics clock. So for instance, each time a VBI signal is detected, the video rendering clock can be moved up accordingly. This allows the rendering process to more accurately time its activities with the display cycle. For example, there may be other tasks that the software rendering engine completes in certain VBI cycles.

Alternatively or additionally, clock drift between the graphics clock and the reference clock can also be deduced by updating the video rendering clock upon detection of each VBI event and comparing the video rendering clock with the time of the reference clock.

As will be discussed in more detail below, the clock synchronization process of act 710 can allow the software-based video rendering process to be slaved to a live video source clock from a standard TV broadcasting media such as terrestrial, cable, and satellite sources.

Also, as will be discussed in more detail below, keeping an accurate video render clock allows the software-based video rendering process to synchronize other components and/or presentations. For example, the software-based video rendering process may determine the actual time that an image will be generated from a given video frame.

The software-based video rendering process may then utilize the actual presentation time to reduce audio visual disparity. For example, the software-based video rendering process may communicate the actual display time of a video frame to the audio decoder and/or audio rendering engine so that the audio and visual aspects can be synchronized.

For example, upon receiving the VBI signal at the start of the odd field of the current frame, the software-based video rendering process knows that it will render the next frame upon receiving the next VBI signal in about 16.67 ms. The software-based video rendering process also knows that scanning of the next frame will commence at that point in time. As such, the software-based video rendering process may direct the audio rendering engine to render the associated audio packets 16.67 ms later. Such a synchronization process can produce audio video synchronization within a definite upper limit that is far below human perception.

At act 712, the software-based video rendering process once again checks whether the system is ready for a new frame. This step checks the running state of the system to ensure that resources are not wasted on unneeded rendering. If the system is not ready for the next frame (i.e., the "No" branch), the process waits until the system is ready. Once the system is ready (i.e., the "Yes" branch), it is determined whether the software-based video rendering process is in a rendering cycle (act 714). For example, the software-based video rendering process may check to see if it is scheduled to render a frame in the next 33.34 ms or not. One example of such scheduling is described above in relation to FIG. 3.

This act, among other attributes, can allow for improved resource allocation. If the software-based video rendering process foresees the desire to reserve a certain amount of resources, most notably the graphics hardware resource, in a video rendering cycle then the software-based video rendering process keeps resources which are reserved for it. If the software-based video rendering process completes the video rendering in a given rendering cycle, then the software-based video rendering process may let other processes utilize some of its reserved processing resources. By tracking the display cycle and/or the VBI cycle, there may be times when processing resources which are reserved for the software-based video rendering process can be reallocated to other processing tasks. Tracking the VBI cycle and updating the video rendering clock allow the software-based video rendering process to know when the resources should be reserved for the software-based video rendering process and when they are available for other processing tasks.

For example, assume that the software-based video rendering process needs a specific graphics hardware unit to perform specific operation tasks before the software-based video rendering process can schedule a surface flip in a rendering VBI cycle. Surface flipping is described above in relation to FIG. 2. Further, assume that other modules, such as a user interface (UI) module, use the same graphics hardware unit. The software-based video rendering process gives priority to the rendering process so that the rendering process can complete its tasks on time. Other components, such as the UI module may be allowed to utilize processing resources once the rendering process has completed its scheduled tasks.

One technique for ensuring that the software-based video rendering process is able to timely achieve its processing tasks is to allow the software-based video rendering process to grant or deny access to the graphics unit to other software modules desiring to issue any tasks to the graphics unit. For instance, the software-based video rendering process may measure the percentage of the graphics unit's resources that the software-based video rendering process should reserve. In an extreme case, if the software-based video rendering process needs 100% of the graphics unit's resources, then the software-based video rendering process can determine the latest time span that the software-based video rendering process should have 100% of the graphics unit's resources to succeed in scheduling a surface flip before the rendering VBI cycle expires. Hence, the software-based video rendering process can limit or gate other software modules' usage of the graphics unit accordingly. For example, the software-based video rendering process can turn on the resource gate just after the software-based video rendering process schedules the surface flip, but only allow the UI module to use a certain percentage of the graphics unit up to a certain time in the future. Then the software-based video rendering process turns off the resource gate to the other software modules such that all tasks scheduled will be completed before a certain time into the rendering VBI cycle so that the tasks that the software-based video rendering process may schedule will be completed with enough safety margin to allow the software-based video rendering process to schedule the surface flip, before the rendering VBI cycle expires.

If the software-based video rendering process is not in a rendering cycle, then the process proceeds to act 716. If the process is in a rendering cycle then the process proceeds to act 718.

At act 716, the software-based video rendering process releases the flipped surface, i.e. the previously scanned frame. Note, that as discussed earlier, the memory buffer attached to the back surface has been swapped with that of front surface. Therefore the process can release the present back surface along with its attached buffer to the buffer queue. The video decoder can acquire the released buffer in order to fill the buffer with a newly decoded video frame in the order of the presentation timestamps. Such a buffer is designated as video buffer 122B in FIG. 1. At this point the process proceeds to act 708.

At act 718, where the software-based video rendering process is in a rendering VBI cycle, the process checks whether the next frame is available. In some configurations, the next video frame should be available to the software-based video rendering process to acquire and consume from the buffer FIFO queue such as from buffer 122A described in relation to FIG. 1. This particular FIFO buffer queue is filled by the software-based video decoding process in chronological order according to the frame presentation timestamps. In one scenario, the software-based video decoding process has decoded one or more frame(s) and has filled them to the buffer(s) acquired from video buffer 122B as described in relation to FIG. 1 and placed the video frames into video buffer 122A of FIG. 1 for receipt by the software-based video rendering engine. In another scenario, glitches may prevent the software-based video decoding process from delivering the next video frame in time. If this latter situation occurs and the next video frame is not available during the VBI rendering cycle, then the software-based video rendering process proceeds to act 720. If the next frame is available, the software-based video rendering process takes it out of the queue and proceeds to act 724.

At act 720, since the software-based decoding process does not deliver the video frame in time, the software-based video rendering process extends the display of the currently displayed video frame for one or more VBI cycles. One approach is to extend the current frame for another two VBI cycles or about 34 ms. The process then proceeds to act 722.

At act 722, in order to allow the software-based video decoding process to make up the loss and to allow the decoding process to catch up, the software-based video rendering process instructs the decoding process to drop a subsequent video frame.

Processing resources may be saved by allowing the software-based video decoding process to select the subsequent frame to drop to compensate for a late frame. For example, assuming a compressed video stream contains reference frames and non-reference frames. The software-based video decoding process must decode all the reference frames, which will be used to decode other frames. Therefore, the decoding process can choose not to decode a non-reference frame. Typically, non-reference frame takes several times more system resources to decode. One or more non-reference frames are usually present in between two reference frames. Hence by not decoding a non-reference frame, the software-based video decoding process can catch up in no more than two frame times. For instance, if the next frame to be decoded is a non-reference frame, then the video decoder can drop that frame. If the next frame is a reference frame, then the following frame should be a non-reference frame and the video decoder can drop that frame. This allows the presentation timestamp of a displayed video frame to deviate from that of the corresponding rendered audio samples by 34 ms or less for two display cycles or less and then the audio and video may be resynchronized.

As a concrete example, a main profile of standard based video compression such as MPEG-2/4/10 or WMV9 video contains B (bidirectional predicated) frames, which are not necessary to decode since a B frame is not used as a reference frame for constructing other frames. A B frame also takes more system resources to decode when compared with other frame types. Therefore, the software-based video decoding process could choose not to decode the first B frame it encounters after it receives the drop frame command of act 722.

An alternative approach, not shown in FIG. 7A, is to extend the current frame for displaying just one more VBI cycle and to designate the next VBI cycle as a rendering cycle. If the new video frame is available in the next VBI cycle, the new frame is displayed for just one VBI cycle. This scheme may be limited to once per incidence of act 720 within the next 4 VBI cycles. After the single incidence, the current frame can be display for another two VBI cycles as described at act 720 to allow the video decoding process to catch up.

In an alternative scenario for act 722, if the software-based video rendering process receives the next video frame after the scheduled render time such that the next display cycle has started again on the current frame, then the software-based video rendering process determines if the display cycle is in the first half of the display cycle. If the next video frame is received in the first half of the display cycle, i.e. during the first or even VBI cycle then the process renders the late arriving frame and proceeds to act 730 as if the video frame was rendered on time. This process step allows a frame which is late arriving from the decoder to be displayed for the last half of its display cycle. In the instance where act 722 instructs the video decoder to drop a frame, then the software-based video rendering process proceeds to act 708.

At act 724, the software-based video rendering process obtains the next video frame.

At act 725, the software-based video rendering process checks whether the next video frame is continuous with the previous frame. The software-based video rendering process checks the continuity of the presentation timestamp of the video frame obtained by act 724 with regard to the proceeding frame's presentation timestamp. This check excludes any discontinuity caused by act 722. If a discontinuity exists, the software-based video rendering process proceeds to act 726. If the frames are continuous, the software-based video rendering process proceeds to act 728.

At act 726, since a discontinuity exists, the software-based video rendering process extends the current frame display time up to the difference between the previous frame's presentation timestamp and the next frame's presentation timestamp.

One example that can cause such a discontinuity between the next frame and the preceding frame can occur in the context of playing a DVD, such as a DVD movie, with the software-based video rendering process. In such an example, a DVD menu may be displayed for the user within the video stream of the movie. In one such scenario the menu is invoked and/or removed by a user command. For instance if a user selects to 'pause' playback, a frame representing the menu and indicating the pause condition may be inserted as a video frame in the video stream. As such, the DVD menu is not part of the video stream of the movie. Further, the video frames of the movie have timestamps inserted by the source. The menu may or may not include a time stamp. If the menu does have a timestamp it likely has little or no correlation to the timestamps of the movie frames. As such, each time a menu is inserted or removed from the video stream it creates a discontinuity. Note that the DVD menu can appear at anytime if invoked by a user. Further, it is also difficult to decide exactly how long one still frame is displayed since a user could make a selection at any time. If the user resumes the previous play condition, the menu frame may then be removed creating another discontinuity in the video stream. After extending the display time of the next frame, the software-based video rendering process then returns to act 708.

At act 728, the software-based video rendering process schedules rendering of the next video frame. The act of rendering the next frame can be accomplished by flipping the surface containing the next frame buffer.

The software-based video rendering process steps described above monitor the display cycle via process steps 704-708. The software-based video rendering process then renders the next frame, if available, upon receiving a real-time VBI signal generated at the culmination of scanning the odd field of the current frame. The rendering process need not be this precise. Other exemplary processes may monitor the display cycle and render the next frame anytime after the display cycle of the current frame is more than one half completed. As described above in relation to FIG. 2, once the fields of the current frame are flipped for scanning, the next frame can be rendered and the video hardware will not scan it until the next display cycle. So, for example, some software-based video rendering processes may render the next frame as soon as the software-based video rendering process ascertains that the downstream components are starting the second half of the current display cycle.

After act 728, the software-based video rendering process proceeds to a clock synchronization sub-routine, starting at act 730 before returning to act 708, to repeat the rendering process. At act 730, the software-based video rendering process calculates any difference between the video render clock time and the reference clock. Comparing the reference clock and the video render clock is described above in relation to act 710. If the absolute value of the difference between the video render clock time and the reference clock time is less than the frame display cycle duration, then the software-based video rendering process proceeds to act 708.

If the difference between the video render clock time and the reference clock time is a positive value that is greater than a video frame display cycle, which indicates the video render clock or graphics hardware clock is faster than the reference clock, then the software-based video rendering process proceeds to act 732.

If the difference video between the video render clock time and the reference clock time is a negative value that is greater than a video frame display cycle, which indicates the video render clock or graphics hardware clock is slower than the reference clock, then the software-based video rendering process proceeds to act 734.

At act 732, the software-based video rendering process displays the next frame for four VBI cycles rather than the normal two VBI cycles. Stated another way, the software-based video rendering process doubles the display time of the next video frame by designating that the fourth VBI cycle as the next rendering VBI cycle rather than the second VBI cycle. The software-based video rendering process also deducts the amount of one video frame time from the video clock time. The software-based video rendering process then returns to act 708 to repeat the rendering process.

At act 734, the software-based video rendering process instructs the video decoder to drop a frame and to increment the video clock time by the amount of one video frame time. A very similar principle can be applied when the next frame is received any number of display cycles late. The software-based video rendering process then returns to act 708 to repeat the rendering process.

As a result of the video clock adjustment done in act 732 and/or act 734, the video clock drift time is brought back within one video frame time, or 33 ms of the reference clock and the software-based video rendering process can proceed back to act 708.

The above described process steps are applicable and/or can be adapted to video conforming to other standards beyond the NTSC. For example, for progressive standards, the software-based video rendering process does not use VBI polarity since this is only relevant to interlaced content.

Similarly, the software-based video rendering process is applicable to standards having other cycle durations. In some such implementations, the software-based video rendering process can do reverse telecine. Meaning for example, that the process can effectively achieve a 24 frames per second (fps) rate by rendering video frames as if the frame rate was 30 fps. The software-based video rendering process can then set every fourth frame flip interval to 4 rather than the standard 2, which means every forth frame will be displayed twice as long as the three preceding frames. These are but a few of the possible examples of applications for the software-based video rendering process described above.

Exemplary Audio and Video Presentation Time Scheduling

In some implementations, the software-based audio rendering process and the software-based video rendering process can communicate with each other in a synchronization process to reduce latency upon playback while minimizing the incidence of initial frames being dropped. Further, the synchronization process can be dynamically adaptive to various audio and video formats and associated compression and decompression techniques encountered by the software-based audio rendering process and the software-based video rendering process. Examples of such audio video synchronization are described below in the context of start-up upon receiving a play command and pausing in response to a pause command.

Figure 8:
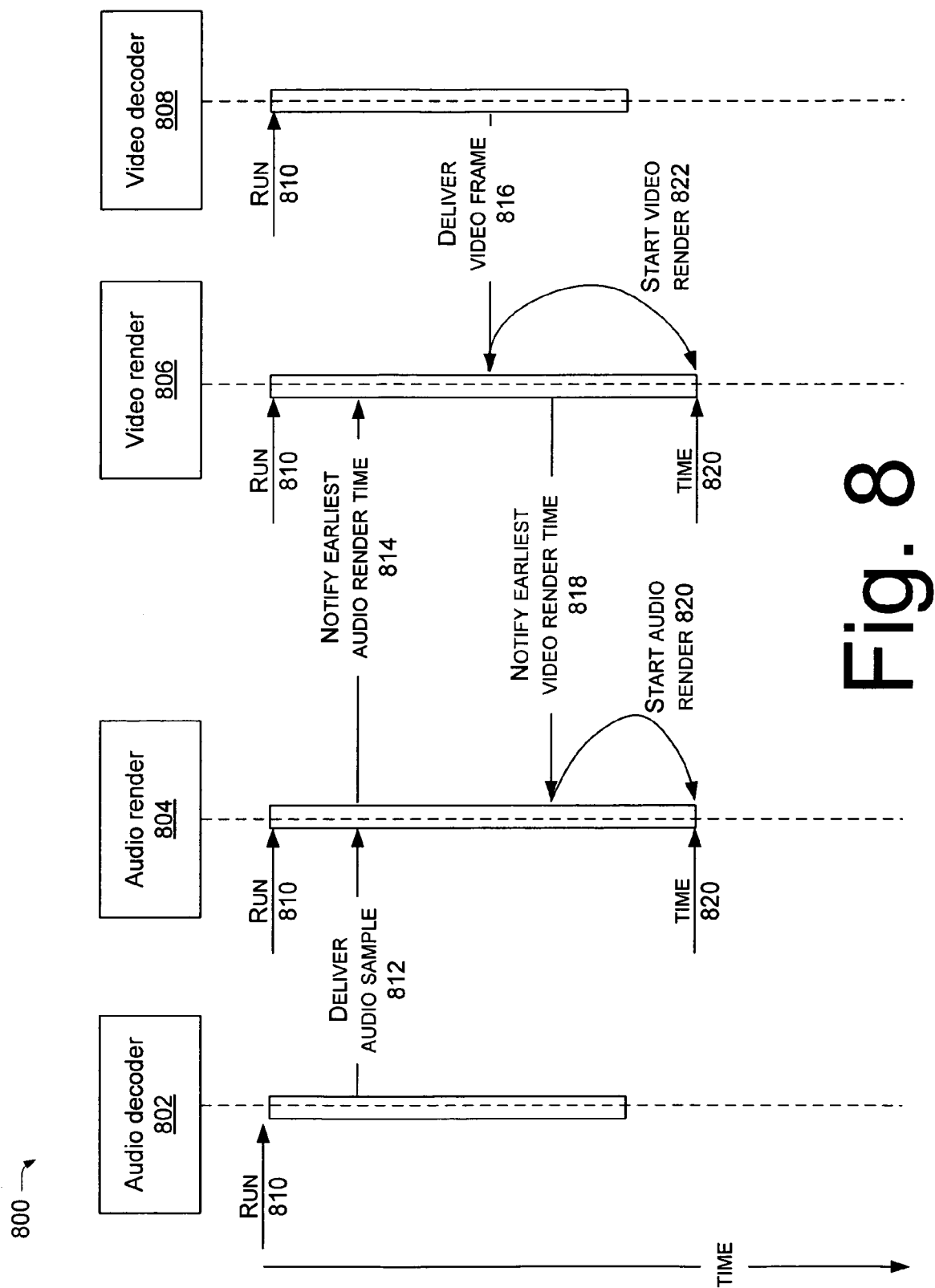
FIGS. 8-9 illustrate a representation of timelines and events associated with exemplary implementations for synchronizing software-based audio rendering and software-based video rendering.

FIG. 8 represents one such audio video synchronization start-up process generally at 800 where time progresses from the top of the page to the bottom of the page. An audio decoder 802, audio render 804, a video render 806 and a video decoder 808 receive a run command at 810. Assume that the run command is to play a movie. At 812, a first audio sample from the movie is delivered from audio decoder 802 to audio render 804. The audio render determines an earliest potential time at which the audio sample can be rendered. At 814, audio render 804 notifies the video render 806 of the earliest potential audio render time for the audio sample. In some implementations, a communication channel and/or associated communication protocols may be pre-established to facilitate the start-up process while reducing latency.

At 816, video decoder 808 delivers a first video frame of the movie to video render 806. The video render ascertains an earliest potential video rendering time for the first video frame. At 818, the video render 806 notifies the audio render 804 of the earliest video render time for the frame. The audio render 804 and the video render 806 are configured to render at the later of the potential audio rendering time and the potential video rendering time. As such at a time 820 corresponding to the later potential render time, the audio render starts the audio render at 822 and the video render starts the video render 824. In this particular example, the audio and video renders made the determination as to the earliest rendering time. Other components such as the decoders could alternatively or additionally be involved in the decision making process.

In another implementation, to facilitate the synchronization process, once the audio render 804 has received a sample and determined the earliest potential render time the audio render may query the video render 806 to determine if the video render has received a corresponding video frame. In the affirmative condition the audio render 804 may query the video render 806 regarding the video renders earliest potential render time. Similarly, the video render may query the audio render.

Figure 9:
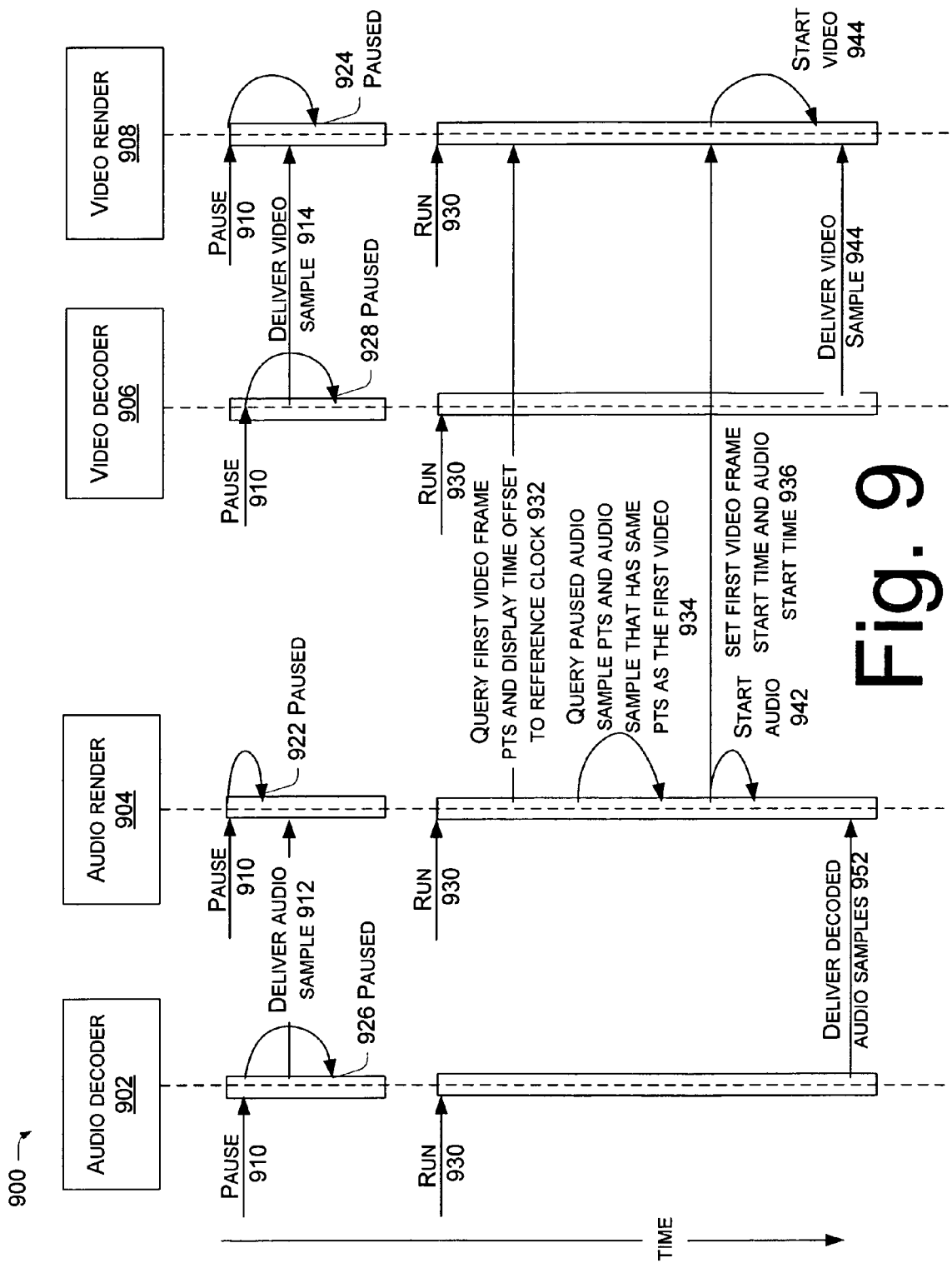

FIG. 9 represents another audio video synchronization process generally at 900 where time progresses from the top of the page to the bottom of the page. In this instance the synchronization process involves a user pause command. An audio decoder 902, audio render 904, a video decoder 906 and a video render 908 receive a pause command at 910. Assume that the pause command is received during the course of playing a movie and audio render 904 receives the pause command earlier than video render 908. When the audio decoder 902 and video decoder 906 receive the pause command, they may still deliver decoded samples to the audio render and the video render respectively, until buffers used to deliver media samples run out (act 912, 914).

At act 922, the audio render suspends the audio hardware so that the audio hardware no longer consumes audio samples. At this point, the audio render completes its transition from the running state to the paused state. However, there are audio samples queued in the audio driver. The DMA cursor position indicates which audio sample will be consumed when the audio hardware is resumed to a running or play state. At act 924, the video render stops rendering video frames. At this point, the video render completes the transition from a running state to a paused state. However, there are a few decoded video frames in the FIFO queue waiting to be rendered.

Since the audio render and the video render are no longer consuming media samples in the paused state, the buffers holding decoded samples will not be released. Soon the decoders will run out of buffers, so they will also enter into a paused state (act 926 and 928). At act 930 when the user resumes playing the media, the running command is sent to every module including audio decoder 902, audio render 904, video decoder 906 and video render 908.

In response to act 930, audio render 904 starts to query as to what exact time the video render can produce the next video frame for the video hardware in accordance with the frame presentation timestamp (PTS) at 932. As discussed earlier, the video render keeps track of VBI signals generated by the video hardware's display cycle so that the video render can determine the exact time with respect to the reference clock that the video frame will be displayed. This time can be expressed as $t_n = t_0 + n \times 33.34$ in milliseconds where $t_0$ extends from the current reference clock time t to the end time of the next VBI cycle time, and n is an integer (see discussion related to FIG. 6 for details).

Similarly, at act 934, the audio render can query for the paused audio sample PTS and the audio sample that has the same PTS as the first video frame of act 932. By reading the DMA cursor position after the audio hardware is suspended, the audio render can tell the PTS of the next sample that the audio hardware will render. The difference, which is designated as $\Delta t$, of the next video frame PTS and next audio sample PTS is the time that the audio render should start before the video render starts.

Since the next video frame can only start at $t_n$ and the current time based on the reference clock is t, therefore n is the integer part of $\Delta t / 33.34$ plus 1 and the audio hardware should resume to play at $t_n - \Delta t$. In other words, a time at which the audio hardware resumes is adjusted so that at act 942 $\Delta t$ worth of audio samples have already been consumed when at act 944 the next video frame is displayed. As such, the audio hardware starts to render audio samples having PTSs very close to the video frame PTS. After this event, the audio and video renders start to release media sample buffers. Once those samples are consumed the decoders can deliver new media samples to the renders (act 952 and 954). This also applies to an instance where the audio render receives a pause command later than video render $\Delta t < 0$, which means that the audio hardware will resume later than the video render by $|\Delta t|$.

CONCLUSION

Various concepts are described above relating to software-based audio and video rendering. Various implementations can combine these concepts in a multitude of configurations. For instance, the video clock slaving concepts can be utilized to provide real-time video rendering while synchronizing the video clock to an external clock such as a source. The audio clock could by synchronized toe the video clock utilizing the insertion and decimation concepts. Audio and video start-up synchronization can facilitate communication between the audio rendering process and the video rendering process to reduce latency upon playback while minimizing the incidence of initial frames being dropped.

The invention claimed is:

1. A computer-readable storage media comprising computer-executable instructions that, when executed, perform acts, comprising:
    measuring a first drift rate between an external clock and an audio clock until the drift reaches a first threshold;
    responsive to the drift reaching the first threshold and based upon the first drift rate, manipulating the audio clock to achieve a second drift rate having a smaller value and an opposite polarity from the first drift rate; and
    further manipulating the audio clock so that the audio clock oscillates at the second drift rate around the measured rate between opposite polarities of a second threshold having a lesser magnitude than the first threshold,
    wherein the further manipulating comprises determining a third drift rate which is smaller than the second drift rate and which is sufficiently large so that the audio clock drifts past the measured rate within a predetermined time period.

2. The computer-readable storage media of claim 1, further comprising ascertaining a source audio sample rate.

3. The computer-readable storage media of claim 2, wherein the measuring comprises determining a rate difference between the external clock and an audio hardware clock and adding the difference to the source audio sampling rate.

4. The computer-readable storage media of claim 1, wherein the predetermined time period equals 15 minutes.

5. The computer-readable storage media of claim 1, further comprising calculating progressively smaller drift rates until a minimum value is established within which the audio clock drift will oscillate around the measured rate between opposite polarities of the second threshold within the predetermined time period.

6. The computer-readable storage media of claim 1, wherein the second threshold is at least twice as large as an amount of jittering inherent to the audio clock and the second threshold is also small enough that at the second drift rate the audio clock drifts between opposite polarities of the second threshold in less than one hour.

7. The computer-readable storage media of claim 1, wherein at the second drift rate the audio clock drifts from a positive polarity of the second threshold to a negative polarity of the second threshold in about the same amount of time as the audio clock takes to drift from the negative polarity of the second threshold to the positive polarity of the second threshold.

8. A computer-readable storage media comprising computer-executable instructions that, when executed, perform acts, comprising:
    measuring an audio clock rate relative to an external clock rate;
    manipulating the audio clock such that the audio clock oscillates at a first rate around the measured rate; and
    further manipulating the audio clock so that the audio clock oscillates at a second rate around the measured rate,
    wherein the further manipulating comprises determing a third rate which is smaller than the second rate and which is sufficiently large so that the audio clocks drifts past the measured rate within a predetermined time period.

9. The computer-readable storage media of claim 8, further comprising selecting a first threshold value and wherein when drift between the audio clock rate and the measured rate equals the first threshold value, adjusting the audio clock rate to achieve a reduced drift rate relative to the measured rate.

10. The computer-readable storage media of claim 9, wherein said adjusting comprises rendering at least one audio sample twice in a given unit time.

11. The computer-readable storage media of claim 9, further comprising selecting a second threshold having an opposite polarity as the first threshold and when the drift reaches the second threshold further manipulating the audio clock rate such that the audio clock rate drifts back across the measured rate.

12. The computer-readable storage media of claim 11, wherein said further manipulating comprises decimating at least one audio sample that would otherwise be rendered.

* * * * *